United States Patent
Nasu et al.

(10) Patent No.: US 8,150,219 B2
(45) Date of Patent: Apr. 3, 2012

(54) WAVEGUIDE-TYPE OPTICAL INTERFEROMETER

(75) Inventors: Yusuke Nasu, Atsugi (JP); Manabu Oguma, Atsugi (JP); Yasuaki Hashizume, Yokosuka (JP); Yasuyuki Inoue, Atsugi (JP); Hiroshi Takahashi, Atsugi (JP); Kuninori Hattori, Atsugi (JP); Toshikazu Hashimoto, Atsugi (JP); Yohei Sakamaki, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 392 days.

(21) Appl. No.: 12/521,867

(22) PCT Filed: Dec. 27, 2007

(86) PCT No.: PCT/JP2007/075083
§ 371 (c)(1),
(2), (4) Date: Jun. 30, 2009

(87) PCT Pub. No.: WO2008/084707
PCT Pub. Date: Jul. 17, 2008

(65) Prior Publication Data
US 2010/0104237 A1    Apr. 29, 2010

(30) Foreign Application Priority Data

Jan. 10, 2007 (JP) ................. 2007-002362
Aug. 28, 2007 (JP) ................. 2007-221365

(51) Int. Cl.
*G02B 6/27* (2006.01)
*G02B 6/26* (2006.01)

(52) U.S. Cl. ............... 385/11; 385/27; 385/14; 385/40; 385/41; 385/42; 385/130; 385/132; 356/460

(58) Field of Classification Search ............ 385/11, 385/14, 39, 40, 41, 42, 129, 130, 131, 132, 385/1, 2, 3; 356/460, 477, 487, 491
See application file for complete search history.

(56) References Cited

U.S. PATENT DOCUMENTS 4,900,112 A    2/1990 Kawachi et al.
(Continued)

FOREIGN PATENT DOCUMENTS

EP    1 191 364 A1    2/2002
(Continued)

OTHER PUBLICATIONS

Y. Inoue et al., Elimination of Polarization Sensitivity in Silica-Based Wavelength Division Multiplexer Using a Polyimide Half Waveplate, Journal of Lightwave Technology, vol. 15, No. 10, Oct. 1997, pp. 1947-1957.

(Continued)

*Primary Examiner* — Brian Healy
(74) *Attorney, Agent, or Firm* — Workman Nydegger

(57) ABSTRACT

In an optical interferometer, polarization dependence attributable to the optical path difference has conventionally been eliminated by inserting a half-wave plate at the center of the interferometer. However, light induced by polarization coupling produced in directional couplers used in the optical interferometer causes interference having different interference conditions from those of the normal light. Polarization rotators that effect any one of 90° rotation and −90° rotation of all states of polarization of incoming light are inserted in the optical interferometer, and thereby the interference conditions of light induced by polarization coupling are made the same as those of the normal light. Each of the polarization rotators is implemented by using two half-wave plates and by varying an angle of combination of these half-wave plates. Alternatively, each of the polarization rotators is implemented through a combination of one half-wave plate and a waveguide having birefringence properties.

13 Claims, 25 Drawing Sheets

U.S. PATENT DOCUMENTS

| | | | |
|---|---|---|---|
| 6,075,596 A * | 6/2000 | Pan et al. | 356/477 |
| 6,947,619 B2 * | 9/2005 | Fujita et al. | 385/11 |
| 7,260,281 B2 * | 8/2007 | Salib et al. | 385/11 |
| 7,899,279 B2 * | 3/2011 | Nasu et al. | 385/14 |
| 2002/0037126 A1 | 3/2002 | Martinelli et al. | |
| 2002/0097946 A1 * | 7/2002 | Fujita et al. | 385/11 |
| 2004/0165808 A1 | 8/2004 | Lauzon | |
| 2010/0104237 A1 * | 4/2010 | Nasu et al. | 385/11 |

FOREIGN PATENT DOCUMENTS

| | | |
|---|---|---|
| EP | 1 315 007 A1 | 5/2003 |
| JP | 7-018964 | 3/1995 |
| JP | 2614365 | 2/1997 |
| JP | 2005-10805 A | 1/2005 |
| JP | 2006-301501 | 11/2006 |
| JP | 2007 286426 A1 | 11/2007 |

OTHER PUBLICATIONS

C.R. Doerr et al., Polarization-Insensitive Planar Lightwave Circuit Dual-Rate Mach-Zehnder Delay-Interferometer, IEEE Photonics Technology Letters, vol. 18, No. 16, Aug. 15, 2006, pp. 1708-1710.

C.R. Doerr, et al., Two Mach-Zehnder-Type Tunable Dispersion Compensators Integrated in Series to Increase Bandwidth and/or Range While Maintaining Single-Knob Control, IEEE Photonics Technology Letters, vol. 17, No. 4, Apr. 2005, pp. 828-830.

Shinji Taniguchi et al., *10-Gb/s Polarization-Independent Ti:LiNO$_3$ Modulator*, Technical Digest, CLEO/Pacific Rim 2001, 4$^{th}$ Pacific Rim Conference on Lasers and Electro-Optics, IEEE, vol. 1, 2001, pp. I-90-I-91.

Supplementary European Search Report, dated Mar. 22, 2010, from related European Application No. 07860305.7.

* cited by examiner

|  | HORIZONTAL POLARIZATION | | VERTICAL POLARIZATION | |
|---|---|---|---|---|
|  | NORMAL (COUPLED) LIGHT | LIGHT INDUCED BY POLARIZATION COUPLING | NORMAL (COUPLED) LIGHT | LIGHT INDUCED BY POLARIZATION COUPLING |
| THROUGH | 0° | 0° | 0° | 0° |
| CROSS | 90° | -90° | 90° | 90° |

A. CENTER (CONVENTIONAL ART)    B. ASYMMETRY (PRESENT EMBODIMENT)

(b)

|  | ROTATED LIGHT || UNROTATED LIGHT ||
|---|---|---|---|---|
| | CONVERSION | AMOUNT OF PHASE | CONVERSION | AMOUNT OF PHASE |
| (a) | TM →TE | $\phi_{TM \to TE}$ | (c) TM →TM | $\phi_{TM \to TM}$ |
| (b) | TE →TM | $\phi_{TE \to TM}$ | (d) TE →TE | $\phi_{TE \to TE}$ |

WAVEGUIDE-TYPE OPTICAL INTERFEROMETER

TECHNICAL FIELD

The present invention relates to a waveguide-type optical circuit and more particularly to a polarization-independent waveguide-type optical interferometer having no polarization dependence.

BACKGROUND ART

As the optical communication technology moves forward, development of optical components capable of directly processing optical signals becomes increasingly important. Above all, a waveguide-type optical interferometer utilizing interference of light in an optical waveguide structure integrated on a planar substrate is superior in mass production and has advantageous features such as low cost and high reliability. Typically included are an arrayed waveguide grating, a Mach-Zehnder interferometer, and a lattice circuit, for example.

Standard photolithography and etching as well as glass deposition technology such as FHD (flame hydrolysis deposition) are used as a basic method for fabrication of the waveguide-type optical interferometer. A procedure for the fabrication involves, first, depositing on a substrate an undercladding layer and a core layer with a higher refractive index than its surroundings, and then, forming a waveguide pattern on the core layer. The fabrication is accomplished by, further, burying the core layer beneath an overcladding layer. Signal light propagates through the waveguide-type optical interferometer, as being confined within a waveguide formed by the buried core layer.

FIG. 1 is a diagram showing the configuration of an asymmetric Mach-Zehnder interferometer (hereinafter called "asymmetric MZI") constructed of the waveguide-type optical interferometer. In the asymmetric MZI, an input waveguide formed of a first input waveguide 101 and a second input waveguide 102 is connected to one end of an optical splitter 103. A long arm waveguide 107 and a short arm waveguide 108 of different lengths are connected to the other end of the optical splitter 103. The long arm waveguide 107 and the short arm waveguide 108 are connected to one end of an optical combiner 106. Further, the other end of the optical combiner 106 is connected to an output waveguide formed of a first output waveguide 104 and a second output waveguide 105. The configuration and operation of such an asymmetric MZI are well known and are not described in detail here.

FIGS. 2A and 2B are graphs showing transmission characteristics of the asymmetric MZI. The transmission characteristics refer, for example, to the transmission characteristics across a cross port between the first input waveguide 101 and the second output waveguide 105. FIGS. 2A and 2B each represent a loss spectrum, since the horizontal axis of each graph indicates wavelength as expressed in antilogarithmic form, and the vertical axis thereof indicates loss as expressed in logarithmic form. As shown in FIG. 2B, the loss spectrum is a periodic characteristic. The period of the loss spectrum is inversely proportional to a difference between the optical path lengths of light propagating through the arm waveguides 107 and 108, respectively. The optical path lengths are each expressed by the integral value of the refractive index along the optical path of the propagating light.

Generally, in the waveguide-type optical circuit, a material for forming the waveguide is birefringent. Hence, there are changes in various characteristics of the optical circuit, resulting from birefringence, depending on the state of input polarization. More specifically, in the waveguide-type optical circuit, the substrate, the cladding layer, the core layer, and the like are formed of different materials. Thus, the materials have different coefficients of thermal expansion, which in turn bring about the birefringence. In the above-mentioned procedure for the fabrication of the optical circuit, the materials undergo the process of heat treatment at a high temperature of 1000 degrees or more, and hence, under normal temperature conditions, thermal stresses of very great magnitude appear across parts of the waveguide. A photoelastic effect caused by the thermal stresses leads to the occurrence of the birefringence in the waveguide.

FIG. 2A is the graph showing the transmission characteristics of the asymmetric MZI, provided that the birefringence occurs. Owing to the birefringence, the loss spectrum characteristic varies according to the state of polarization of incoming light, and thus, polarization dependence develops in the loss spectrum characteristic. The reason is that, depending on the state of the input polarization, variations in the refractive index experienced by the propagating light occur and thus cause a slight variation in the period of the loss spectrum. The slight variation in the period appears as a shift in the loss spectrum characteristic along the wavelength (or frequency) axis, provided that the loss spectrum is observed with respect to a given waveband. The amount of shift varies according to the state of the input polarization, and thus the polarization dependence develops in the circuit characteristics. Signal light from a light source for use in an actual optical system is light in various states of polarization combined together, and hence the polarization dependence is an important problem involved in the waveguide-type optical circuit. One of indices indicative of the extent of the polarization dependence is PDf (Polarization Dependence frequency shift). As for the PDf, a difference between a maximum shift toward higher frequencies (or toward shorter wavelengths, corresponding to polarization 1 shown in FIG. 2A) and a maximum shift toward lower frequencies (or toward longer wavelengths, corresponding to polarization 2 shown in FIG. 2A) is called the PDf (Polarization Dependence frequency shift), provided that light in every state of polarization comes in. There is a demand for a reduction in the PDf in the interferometer.

(Conventional Art 1)

There have been proposals of several methods for solving the above-mentioned problem of the polarization dependence. For instance, an amorphous silicon layer or a groove may be formed on or in the surface of the substrate to form a stressing layer and thereby control the birefringence partially or wholly in the waveguide. Control of the birefringence enables a reduction in the polarization dependence throughout the entire optical interferometer (See Patent Document 1). However, such a method has difficulty in stably and reliably suppressing the polarization dependence, since the birefringence varies from one optical circuit to another or from one production lot to another because of manufacturing variability or the like.

(Conventional Art 2)

There has been a proposal of another solving method, which involves placing a polarization mode converter, specifically a half-wave plate, in the interferometer, thereby eliminating the polarization dependence of the interferometer (See Patent Document 2). In this method, the half-wave plate with its optic axis inclined at 45° is placed at the center of the interferometer. The half-wave plate converts horizontal polarization into vertical polarization, and converts vertical polarization into horizontal polarization. This enables elimination of the polarization dependence of the interferometer, for incoming light in a horizontally polarized state or incoming light in a vertically polarized state. As employed herein, the horizontal polarization and the vertical polarization refer to light such that the direction of amplitude of its electric field is horizontal with respect to the plane of the substrate of the optical circuit having the waveguide of rectangular or substantially rectangular cross section, and light such that the direction of amplitude of its electric field is vertical with respect to the plane of the substrate, respectively. This method is an effective means, since the half-wave plate can be used to eliminate the polarization dependence of the interferometer, even if the birefringence in the waveguide varies from one optical circuit to another during the fabrication of the optical circuit.

FIG. 3 is a diagram of configuration of a simple asymmetric MZI. By use of analytical expressions, description will be given below with regard to a polarization dependence elimination operation, which is performed in the interferometer having the half-wave plate interposed therein according to the above-mentioned conventional art 2. In FIG. 3, the optical splitter 103 and the optical combiner 106 are placed at points 3A and 3C, respectively. The optical splitter 103 and the optical combiner 106 are connected by the two arm waveguides 107 and 108 of different lengths. In the asymmetric MZI of such a configuration, the birefringence of the waveguide is designated by B; the refractive index for the horizontal polarization, $n_{TE}$; the refractive index for the vertical polarization, $n_{TM}$; a difference in waveguide length between the long arm waveguide 107 and the short arm waveguide 108, $\delta L$; and the length of the short arm waveguide 108, 2L. In the asymmetric MZI shown in FIG. 3 in which the half-wave plate is not placed, an optical path difference $\delta L_{TE}$ between the two arms is expressed by Equation (1), provided that signal light in a horizontally polarized state comes in.

[formula 1]

$$\delta L_{TE} = (2L+\delta L) \times n_{TE} - 2L \times n_{TE} = \delta L \times n_{TE} \quad \text{Equation (1)}$$

Meanwhile, an optical path difference $\delta L_{TM}$ between the two arms is expressed by Equation (2), provided that signal light in a vertically polarized state comes in.

[formula 2]

$$\delta L_{TM} = (2L+\delta L) \times n_{TM} - 2L \times n_{TM} = \delta L \times n_{TE} \quad \text{Equation (2)}$$

Generally, in the interferometer, the optical path difference determines interference conditions and thus determines interferometer characteristics such as the loss spectrum. As can be seen from Equations (1) and (2), the optical path difference for the horizontal polarization is different from that for the vertical polarization, so that the interference conditions vary according to the state of the input polarization.

FIG. 4 is a diagram showing the configuration of the asymmetric MZI having the half-wave plate interposed at the center. In FIG. 4, the optical splitter 103 and the optical combiner 106 are placed at points 4A and 4C, respectively. The optical splitter 103 and the optical combiner 106 are connected by the two arm waveguides 107 and 108 of different lengths. The horizontal polarization and the vertical polarization change places between before and after a half-wave plate 400 along each of the long arm waveguide 107 and the short arm waveguide 108, by the conversion function of the half-wave plate. Therefore, the optical path difference $\delta L_{TE}$ between the two arm waveguides is represented as Equation (3), provided that the signal light in the horizontally polarized state comes in.

[formula 3]

$$\delta L_{TE} = \begin{bmatrix} (L+\delta L/2) \times n_{TE} + \\ (L+\delta L/2) \times n_{TM} \end{bmatrix} - [L \times n_{TE} + L \times n_{TM}] \quad \text{Equation (3)}$$
$$= \delta L \times (n_{TE} + n_{TM})/2$$

Meanwhile, the optical path difference $\delta L_{TM}$ between the two arm waveguides is represented as Equation (4), provided that the signal light in the vertically polarized state comes in.

[formula 4]

$$\delta L_{TM} = \begin{bmatrix} (L+\delta L/2) \times n_{TM} + \\ (L+\delta L/2) \times n_{TE} \end{bmatrix} - [L \times n_{TM} + L \times n_{TE}] \quad \text{Equation (4)}$$
$$= \delta L \times (n_{TE} + n_{TM})/2$$

As can be seen from Equations (3) and (4), the optical path difference for the incoming signal light in the horizontally polarized state becomes equal to that for the incoming signal light in the vertically polarized state. In the interferometer, the loss spectrum is determined by the optical path difference. The optical path difference for the horizontal polarization becomes equal to that for the vertical polarization, so that the loss spectrum of the interferometer becomes polarization-independent.

As described above, the half-wave plate 400 is interposed in the interferometer thereby to eliminate the polarization dependence of the interferometer, provided that the horizontally polarized light alone comes in or provided that the vertically polarized light alone comes in. The polarization dependence mentioned above is based on the optical path difference between paths of different lengths inherent in the interferometer. The conventional art achieves the elimination of the polarization dependence developed by the optical path difference and the phenomenon of birefringence.

Patent Document 1: Japanese Patent Laid-Open No. H 07-018964 (1995)

Patent Document 2: Japanese Patent No. 2614365

DISCLOSURE OF THE INVENTION

However, the method using such a half-wave plate as mentioned above cannot, in fact, completely eliminate the polarization dependence. The above-mentioned method can eliminate the polarization dependence, only when input light is anyone of horizontally polarized light alone and vertically polarized light alone. This method does not necessarily enable the interferometer to be polarization-independent, for input light in all states of polarization, such as light in various states of polarization coexisting together at a time. The reason is that light induced by polarization coupling is produced in the optical splitter and the optical combiner that act as structural components of the interferometer, and, in turn, the light induced by polarization coupling causes a change in the state of interference of the interferometer. Detailed description will be given below with regard to the light induced by polarization coupling produced in the optical circuit.

The polarization coupling refers to the exchange of energy between polarization eigenmodes capable of propagation through the waveguide. This may be referred to as polarization conversion in some cases. For instance, at the occurrence of the polarization coupling in a general rectangular waveguide of rectangular cross section, propagating light in a vertically polarized state is partially converted into horizontally polarized light. Likewise, propagating light in a horizontally polarized state is partially converted into vertically polarized light. At the occurrence of such polarization coupling in the optical splitter, the optical combiner, or the like, light that has undergone the polarization coupling, besides normal coherent light that has not undergone the polarization coupling (hereinafter called "normal light" for distinction from the light that has undergone the polarization coupling), is added as additional coherent light. Thus, the interference conditions for the overall interferometer vary from the original interference conditions set assuming the presence of the normal light alone. The variation in the interference conditions depends on the state of polarization of incoming light inputted to the interferometer, and thus the polarization dependence develops in various characteristics of the interferometer.

Description will now be given in analytical form with regard to the polarization dependence of the asymmetric MZI as designed allowing for the occurrence of the polarization coupling in the optical splitter and the optical combiner. The polarization coupling and the amount of phase shift of propagating light in the optical splitter or the optical combiner are important factors, taking into account interference characteristics of the asymmetric MZI. A directional coupler or a multimode coupler is generally used as each of the optical splitter and the optical combiner. Description will be given hereinafter with the directional coupler taken as an example; however, the polarization coupling occurs also in a coupler and a splitter in other forms, which in turn leads to the problem of the polarization dependence of the interferometer.

FIG. 5A, FIG. 5B and FIG. 5C are a view and diagrams, respectively, explaining the polarization coupling in the directional coupler. The directional coupler is configured as shown in a bird's-eye view of FIG. 5A. Two waveguides are far apart from each other in an input portion (a-a'), while the two waveguides gradually get closer to each other (b-b'), and light propagating through one of the waveguides is coupled to the other waveguide. Then, the two waveguides get away from each other again in an output portion (c-c'). Signal light inputted to In1, for example, not only exits through Out1 but also partially exits as coupled light through Out2. If such a directional coupler is implemented in a buried optical circuit, the optic axes of the waveguides are inwardly inclined in a location where the two waveguides are in close proximity to each other. Generally, the inclination of the optic axes can possibly be caused by stresses or the like in the vicinity of the waveguides. The optic axis of polarization is a general term for a fast axis on which the velocity of light is high and a slow axis on which the velocity of light is low. Further detailed description will be given below.

FIG. 5B is the diagram explaining the polarization coupling of signal light in a horizontally polarized state. FIG. 5B explains a change in the state of polarization in the above-mentioned input portion (a-a'), close proximity portion (b-b') and output portion (c-c'). In the input portion, incoming horizontally-polarized light having a horizontal electric field component alone is shown as inputted only to the In1. As the two waveguides get closer to each other, the optic axes of the waveguides, shown by the vertical broken lines in FIG. 5B, are inclined. Thus, in the close proximity portion (b-b'), the direction of amplitude of the electric field is inclined downwardly rightwards with respect to a horizontal direction. It is to be here noted that the optic axes of the adjacent waveguides are inclined in such a manner as to lean against each other. The signal light in such a polarized state that the direction of amplitude of the electric field is inclined is coupled to the adjacent waveguide. When the waveguides extend beyond the close proximity portion and to the output portion (c-c'), in the waveguide toward the Out1, the optic axis is restored to its original state, and the inclination of polarization is likewise restored to its original horizontal state. On the other hand, in the waveguide toward the Out2, the inclination of the optic axis is restored to its original state, while the inclination of polarization remains further inclined at an oblique angle. Thus, the signal light in the horizontally polarized state enters through the In1 of the directional coupler, but nevertheless, vertically polarized light (shown by the heavy downwardly-directed arrow line), as well as the horizontally polarized light, exits through the Out2. The vertically polarized light newly produced on the part of the coupled waveguide is called the light induced by polarization coupling (light induced by polarization conversion).

FIG. 5C is the diagram explaining the polarization coupling of signal light in a vertically polarized state. As in the case of the horizontally polarized light, light induced by polarization coupling in a horizontally polarized state is newly produced on the part of the Out2, even if the vertically polarized light enters through the In1.

Description will now be given with regard to the phase of light propagating through the directional coupler. Typically, if incoming light is coupled to the other waveguide in the close proximity portion, coupled light (or normal light) exiting through the Out2 undergoes a 90° phase shift with respect to light exiting through the Out1. As for light induced by polarization coupling as has been described above, however, a different situation arises. If signal light in a vertically polarized state comes in, light induced by polarization coupling exiting through the Out2 likewise undergoes a 90° phase shift, whereas if signal light in a horizontally polarized state comes in, light induced by polarization coupling exiting through the Out2 undergoes a −90° phase shift.

FIG. 6 is a table showing a list of phase shifts of output light from the directional coupler. An outlet port connected directly to the waveguide containing an inlet port (In1) is commonly referred to as a through port (Out1). Meanwhile, an outlet port on the part of the coupled waveguide opposite to the waveguide containing the inlet port is called a cross port (Out2). All phase shifts indicate the amount of phase shift with respect to signal light which exits through the through port Out1 as a result of signal light entering through the inlet port In1. As for light induced by polarization coupling, it is to be noted that an opposite phase shift can occur, depending on whether the state of polarization of incoming light is horizontal polarization or vertical polarization. Incidentally, the value "90°" is presented in FIG. 6; however, this is not a precise value but is a value in the neighborhood of approximately 90°. Meanwhile, light induced by polarization coupling can possibly exit through the through port Out1; however, description is here given only in consideration for a component of light induced by polarization coupling exiting through the cross port Out2, which is primarily responsible for deterioration in circuit performance due to the polarization dependence.

Analytical discussion will be given with regard to the polarization dependence of the asymmetric MZI having the wave plate interposed therein according to the conventional art 2 (see Patent Document 2), after allowing for the production of the light induced by polarization coupling described above. Discussion is here given for four types of propagating light that greatly affect the transmission characteristics of the asymmetric MZI. Specifically, the four types are as follows:

(type 1) light that is split by the optical splitter, propagates through the long arm, and exits to the cross port, (type 2) light that is split by the optical splitter, propagates through the short arm, and exits to the cross port, (type 3) light that is formed into light induced by polarization coupling in the optical splitter, propagates as the induced light through the short arm, and exits as the induced light to the cross port, and (type 4) light that is split by the optical splitter, propagates through the long arm, is formed into light induced by polarization coupling in the optical combiner, and exits as the induced light to the cross port.

FIGS. 7A and 7B are diagrams explaining the four types of propagating light in the asymmetric MZI. The asymmetric MZI (hereinafter called "asymmetric MZI" for the sake of simplicity) is configured by including the directional coupler 103 that functions as the optical splitter, the directional coupler 106 that functions as the optical combiner, and the long arm waveguide 107 and the short arm waveguide 108 that provide a connection between the directional couplers 103 and 106. According to the conventional art 2, a half-wave plate 700 is placed at the center of the asymmetric MZI. In FIGS. 7A and 7B, propagating light in a horizontally polarized state (indicated by TE) is shown by full lines, and propagating light in a vertically polarized state (indicated by TM) is shown by dotted lines. As mentioned previously, the half-wave plate 700 has the function of converting horizontal polarization into vertical polarization and converting vertical polarization into horizontal polarization. It is to be noted that any type of propagating light undergoes the conversion of its state of polarization at the half-wave plate 400, as shown also in FIGS. 7A and 7B. Any of the above-mentioned four types of propagating light is signal light which enters through one inlet port and exits through the cross port of the asymmetric MZI, and the interference of these four different types of propagating light with one another determines the interference characteristics of the asymmetric MZI circuit taken as a whole.

FIG. 7A shows the propagating light of the above-mentioned types 1 and 2. The propagating light of the types 1 and 2 is the propagating light that comes in as signal light in a horizontally polarized state, does not undergo the polarization coupling in the directional couplers 103 and 106, and exits as vertically polarized light through the cross port. In other words, the propagating light is shown as the normal light (see FIG. 6) that does not undergo any polarization coupling at all, except that it undergoes the conversion by the half-wave plate 700.

FIG. 7B shows the propagating light of the above-mentioned types 3 and 4. The propagating light of the types 3 and 4 is the propagating light that comes in as signal light in a vertically polarized state, is formed into light induced by polarization coupling in the directional coupler 103 or 106, and exits as the induced vertically-polarized light through the cross port. In other words, the propagating light is shown as the light induced by polarization coupling (see FIG. 6) that is produced by undergoing the polarization coupling by the directional coupler, as well as undergoing the conversion by the half-wave plate 700. A group of the propagating light in the form of the normal light shown in FIG. 7A and a group of the light induced by polarization coupling shown in FIG. 7B all exit through the cross port as the signal light in the same state of polarization (i.e., in the vertically polarized state), although the signal light in different states of polarization comes in. Thus, the interference of these four types of propagating light with one another occurs.

Phase shifts experienced by the propagating light in the directional couplers 103 and 106 are also written in the far-right portions of the cross ports shown in FIGS. 7A and 7B. It is to be here noted that the interference of the propagating light of the types 1 and 2 shown in FIG. 7A with each other occurs in phase at the cross port of the asymmetric MZI (e.g., the type 1 has undergone a 90° phase shift, and the type 2 likewise has undergone a 90° phase shift). As opposed to this, the propagating light of the types 3 and 4 induced by the polarization coupling, shown in FIG. 7B, interferes with each other in opposite phase at the through port (e.g., the type 3 has undergone a 90° phase shift, while the type 4 has undergone a −90° phase shift). Thus, a transmission spectrum of the MZI taken as a whole, for the types 1 and 2, exhibits a different interference characteristic from that for the types 3 and 4. If signal light containing coexistence of signal light in different states of polarization, i.e., in a horizontally polarized state and in a vertically polarized state, comes in, interferometer characteristics of the MZI taken as a whole, such as the transmission characteristics, take on complicated polarization dependence. The reason is that the interference exhibits varying characteristics, depending on the intensity ratio or phase difference between a component of the signal light in the horizontally polarized state and a component of the signal light in the vertically polarized state.

The interference characteristic of the interferometer as designed allowing also for the light induced by polarization coupling produced in the directional coupler, as mentioned above, is expressed by the following equation. In the interferometer using the half-wave plate according to the conventional art 2 shown in FIGS. 7A and 7B, a transmission spectrum characteristic for the light which enters through one inlet port and exits through the cross port is given by Equation (5), based on the above-mentioned four types of propagating light (the types 1 to 4):

[formula 5]

$$\begin{aligned} Trans = |E|^2 & \quad \text{Equation (5)} \\ = & \left| \sqrt{1-\varepsilon}\sqrt{1-\kappa_p} \left( \begin{array}{c} e^{-ik(L+\delta L)-i\frac{\pi}{2}} + \\ e^{-ikL-i\frac{\pi}{2}} \end{array} \right) + \right. \\ & \left. \sqrt{\varepsilon} \cdot \sqrt{\kappa_p}\, e^{-i\phi} \left( e^{-ik(L+\delta L)-i\frac{\pi}{2}} + e^{-ikL-i\frac{\pi}{2}} \right) \right|^2 \\ = & A(\varepsilon, \kappa_p) + B(\varepsilon, \kappa_p)\cos(k \times \sigma L) - \\ & C(\varepsilon, \kappa_p)\cos(\phi) \cdot \sin(k \times \delta L) \\ = & A'(\varepsilon, \kappa_p) + B'(\varepsilon, \kappa_p)\cos(k \times \delta L + f(\phi)) \end{aligned}$$

where E denotes the entire electric field of light outputted to the cross port; r denotes the intensity ratio between a horizontal polarization component and a vertical polarization component of input polarization; Φ denotes the phase difference between the horizontal polarization component and the vertical polarization component of the input polarization; $K_P$ denotes the amount of polarization coupling; k denotes a wave number (2π/λ*n); λ denotes a wavelength; n denotes a refractive index of the waveguide; and A, B, C, A', B' and f denote functions each having a simplified coefficient term, not containing the wave number k. From Equation (5), the transmission spectrum is obtained as a periodic function in the form of a COS function. However, the function f(Φ) containing the phase difference is contained in an argument of the COS function. This means that the transmission spectrum represented by the COS function shifts along the wave number axis (or the frequency axis) by the phase difference Φ between the signal light in the horizontally polarized state and the signal light in the vertically polarized state, of the input polarization. With Equation (5) allowing for the light induced by polarization coupling, therefore, PDf still remains in the transmission spectrum. Remember that the PDf has been defined as a shift in the transmission spectrum characteristic along the frequency axis (or the wavelength axis), as shown in FIGS. 2A and 2B.

In the case of the propagation light of only type 1 and 2 as shown in FIG. 7A such that the polarization coupling does not occur in the directional coupler, therefore, the elimination of the polarization dependence of the waveguide is achieved by using the half-wave plate according to the conventional art 2. With the mere simple interposition of the half-wave plate in the interferometer as is the case with the conventional art 2, however, the elimination of the polarization dependence of the interferometer cannot be achieved because of the PDf, so long as the polarization coupling by the directional coupler occurs.

Thus, the light induced by polarization coupling produced in the optical splitter or the optical combiner of the optical interferometer develops the polarization dependence in the optical circuit, because of causing interference under different conditions from the original interference conditions set assuming the presence of the normal light alone. Generally, the optical circuit has difficulty in avoiding the occurrence of the polarization coupling. Various optical circuits such as an arrayed waveguide grating and an optical intensity modulator, as well as the asymmetric MZI described previously by way of example, present the problem of the polarization dependence of optical circuit characteristics resulting from the polarization coupling.

Meanwhile, as for polarization coupling characteristics of the half-wave plate, if the asymmetric MZI demands wideband characteristics, an accuracy of the polarization coupling characteristic sufficiently can not be maintained over the whole wavelength band. The half-wave plate or the like has an optimum range of operating wavelengths, and thus, a wide wavelength range used in the asymmetric MZI renders it difficult to perform accurate conversion operation for all wavelengths. Even if a match is provided between an optimum operating wavelength for the half-wave plate and a desired center wavelength used in an interferometer, the degradation of the polarization coupling characteristic occurs at edge wavelengths in a wavelength band used in the MZI if the band is wide. Due to the degradation of the polarization coupling characteristic, uncoupled light and coupled light by the half-wave palate interferes with each other in one arm waveguide. The interference between the uncoupled light and the coupled light also causes PDf as the interference caused by the light induced by polarization coupling in the directional coupler. Thus, there arises a problem, the limitation of operating bandwidth of MZI due to the degradation of the polarization coupling characteristic of the half-wave plate or the like.

The present invention has been made in view of the foregoing problems, an object of the present invention is to solve the above-mentioned problem of the polarization dependence of the interferometer resulting from the polarization coupling, and further, the problem of the polarization dependence of the interferometer resulting from the interference that occurs in the arm waveguide.

In order to attain the above object, according to one aspect of the present invention, there is provided a waveguide-type optical interferometer including at least one input waveguide, an optical splitter connected to the input waveguide, at least one output waveguide, an optical combiner connected to the output waveguide, and at least two arm waveguides that provide a connection between the optical splitter and the optical combiner, characterized by including: a polarization rotator that effects anyone of 90° rotation and −90° rotation of a state of polarization of light in all operating wavelengths ranges used in the optical interferometer, the polarization rotator being interposed at a midpoint of an optical path length of each of the at least two arm waveguides.

Also, according to the present invention, the waveguide-type optical interferometer is characterized in that the polarization rotator provides a match between an interference condition for light induced by polarization coupling produced in any one of the optical splitter and the optical combiner and an interference condition for input light to the input waveguide.

Further, according to the present invention, the polarization rotator may include separate polarization rotators for the at least two arm waveguides, respectively, and angles of rotation of the state of polarization by the separate polarization rotators may be independently selected.

Preferably, birefringence adjusting regions capable of induction of birefringence may be provided in the at least two arm waveguides, respectively, on any one of the input waveguide side and the output waveguide side of the polarization rotator may further include.

According to another aspect of the present invention, there is provided a waveguide-type optical interferometer including at least one input waveguide, an optical splitter connected to the input waveguide, at least one output waveguide, an optical combiner connected to the output waveguide, and at least two arm waveguides that provide a connection between the optical splitter and the optical combiner, characterized by including: a first half-wave plate interposed at a midpoint of an optical path length of each of the at least two arm waveguides; and a second half-wave plate having an optic axis inclined at any one of 45° and −45° relatively to the first half-wave plate, and interposed in the at least two arm waveguides on any one of the input waveguide side and the output waveguide side of the at least two arm waveguides.

Preferably, the at least two arm waveguides are formed of two arm waveguides of a long arm waveguide and a short arm waveguide, and the first half-wave plate includes separate half-wave plates for the long arm waveguide and the short arm waveguide, respectively, the separate half-wave plates and the second half-wave plate form separate polarization rotators, respectively, the inclinations of optic axes of the respective separate half-wave plates are set so that the optic axes extend in the same direction or form an angle of 90°, and birefringence B is set so as to obtain the relationship m−0.25<α<m+0.20 (where m is an integer) for the value of α expressed by:

$$\alpha = B^* \Delta L / (2^* \lambda) + \Phi / 2\pi$$

where ΔL denotes an optical path difference between the long arm waveguide and the short arm waveguide; B denotes the birefringence of the waveguides; λ denotes a wavelength used in the interferometer; and Φ denotes a phase difference between the arm waveguides, provided that the phase difference Φ is set equal to 0° or 180°, when the inclinations of optic axes of the respective separate half-wave plates are set so that the optic axes extend in the same direction or form an angle of 90°.

Also, preferably, the at least two arm waveguides are formed of two arm waveguides of a long arm waveguide and a short arm waveguide, and the second half-wave plate includes separate half-wave plates for the long arm waveguide and the short arm waveguide, respectively, the first half-wave plate and the separate half-wave plates form separate polarization rotators, respectively, the optic axes of the separate half-wave plates are independently set at any one of 45° and −45° relatively to the first half-wave plate, and birefringence B is set so as to obtain the relationship m−0.25<α<m+0.20 (where m is an integer) for the value of α expressed by:

$$\alpha = B^*\Delta L/(2^*\lambda) + \Phi/2\pi$$

where ΔL denotes an optical path difference between the long arm waveguide and the short arm waveguide; B denotes the birefringence of the waveguides; λ denotes a wavelength used in the interferometer; and Φ denotes a phase difference between the arm waveguides, provided that the phase difference Φ is set equal to 0° or 180°, when the inclinations of optic axes of the respective separate half-wave plates are set so that the optic axes extend in the same direction or form an angle of 90°.

According to still another aspect of the present invention, there is provided a waveguide-type optical interferometer including at least one input waveguide, an optical splitter connected to the input waveguide, at least one output waveguide, an optical combiner connected to the output waveguide, and at least two arm waveguides that provide a connection between the optical splitter and the optical combiner, characterized by including: phase difference providing waveguide portions that provide a phase difference of 180° between polarizations crossing at right angles in the at least two arm waveguides, at operating wavelengths used in the optical interferometer, the phase difference providing waveguide portions being contained in the at least two arm waveguides, respectively; and a half-wave plate having an optic axis inclined at any one of 45° and −45° relative to optic axes of the at least two arm waveguides, and interposed in the at least two arm waveguides at a location corresponding to a midpoint of an optical path length of each of the at least two arm waveguides in the absence of the phase difference providing waveguide portions, the half-wave plate being located in the phase difference providing waveguide portion on any one of the input waveguide side and the output waveguide side.

As employed herein, the phase difference providing waveguide portion is the waveguide that forms the same function as the second half-wave plate whose optic axis is parallel to the optic axes of the waveguides. This corresponds to a retarder waveguide to be described later.

Preferably, a length $L_r$ of the phase difference providing waveguide portions may satisfy the following relationship:

$$\lambda_0^*(0.25+m)/B_r < L_r < \lambda_0^*(0.75+m)/B_r$$

where $B_r$ denotes birefringence of the arm waveguides; $\lambda_0$ denotes a wavelength used in the interferometer; and m denotes an integer. Thereby, a substantial reduction in PDf is achieved.

Further, preferably, the length $L_r$ of the phase difference providing waveguide portions may satisfy the following relationship:

$$L_r = \lambda_0^*(\tfrac{1}{2}+m)/B_r$$

where $B_r$ denotes the birefringence of the arm waveguides; denotes the wavelength used in the interferometer; and m denotes an integer. Thereby, minimization of the PDf is achieved.

Meanwhile, preferably, each of the phase difference providing waveguide portions may be located at the midpoint of the optical path length of a corresponding one of the at least two arm waveguides in the absence of the phase difference providing waveguide portions; each of the at least two arm waveguides may include waveguides located respectively at ends of the corresponding one of the phase difference providing waveguide portions, each waveguide producing an optical path difference that determines an interference condition for the optical interferometer; and the phase difference providing waveguide portions may have an equal value of birefringence.

Further, preferably, the at least two arm waveguides are formed of two arm waveguides of a long arm waveguide and a short arm waveguide, and the half-wave plate includes separate half-wave plates for the long arm waveguide and the short arm waveguide, respectively, sets each including one of the phase difference providing waveguide portions and a corresponding one of the separate half-wave plates form separate polarization rotators, respectively, the optic axes of the separate half-wave plates are independently set at any one of 45° and −45° relatively to the optic axes of the arm waveguides, and birefringence B is set so as to obtain the relationship m−0.25<α<m+0.20 (where m is an integer) for the value of α expressed by:

$$\alpha = B^*\Delta L/(2^*\lambda) + \Phi/2\pi$$

where ΔL denotes an optical path difference between the long arm waveguide and the short arm waveguide; B denotes the birefringence of the waveguides; λ denotes a wavelength used in the interferometer; and Φ denotes a phase difference between the arm waveguides, provided that the phase difference Φ is set equal to 0° or 180°, when the inclinations of optic axes of the respective separate half-wave plates are set so that the optic axes extend in the same direction or form an angle of 90°.

Preferably, the value of α may be an integer thereby to achieve a substantial reduction in the polarization dependence resulting from the interference in the waveguide.

In any one of the aspects of the present invention, the phase difference providing waveguide portion may have a greater waveguide width than other waveguide widths, and have a tapered structure such that the waveguide width varies along the waveguide, at each end. Meanwhile, multiple optical interferometers described previously may be concatenated. Preferably, the optical interferometer may include slab waveguides as the optical splitter and the optical combiner, and include arrayed waveguide gratings as the at least two arm waveguides.

According to a further aspect of the present invention, there is provided a waveguide-type optical interferometer including at least one input waveguide, an optical splitter connected to the input waveguide, at least one output waveguide, an optical combiner connected to the output waveguide, and at least two arm waveguides that provide a connection between the optical splitter and the optical combiner, characterized by including: phase difference providing waveguide portions that provide a phase difference of more than 180° between polarizations crossing at right angles in the at least two arm waveguides, at operating wavelengths used in the optical interferometer, the phase difference providing waveguide portions being contained in the at least two arm waveguides, respectively; and a half-wave plate having an optic axis inclined at any one of 45° and −45° relative to optic axes of the at least two arm waveguides, and interposed in the vicinity of one end of each of the phase difference providing waveguide portions, the position of the half-wave plate being adjusted so that each of the phase difference providing waveguide portions taken as a whole provides a phase difference of 180° by adding a phase difference provided by a short part of the phase difference providing waveguide portion on one side of the half-wave plate, in opposite phase, to a phase difference provided by a long part of the phase difference providing waveguide portion on the other side of the half-wave plate.

In any one of the aspects of the present invention, preferably, birefringence adjusting regions capable of induction of birefringence may be provided in the arm waveguides, respectively, on any one of the input waveguide side and the output waveguide side of any one of the first half-wave plate and the half-wave plate.

The present invention makes it possible to achieve the optical circuit capable of elimination of the polarization dependence resulting from the light induced by polarization coupling. This invention may utilize the polarization rotator of simple configuration having a combination of the two half-wave plates or the waveguides having birefringence properties, thereby to achieve the optical circuit excellent in mass production and also flexibly adaptable to manufacturing variability. Further, this invention achieves a reduction in the interference in the arm waveguide that can possibly occur owing to incompleteness of the polarization coupling in the half-wave plate or the like, thereby achieving the elimination of the polarization dependence.

BRIEF DESCRIPTION OF THE DRAWINGS

FIG. 5B is a diagram explaining the concept of polarization coupling by the directional coupler;

FIG. 5C is a diagram explaining the concept of the polarization coupling by the directional coupler;

FIG. 6 is a table explaining a phase shift of propagating light in the directional coupler;

BEST MODE FOR CARRYING OUT THE INVENTION

Figure 1:
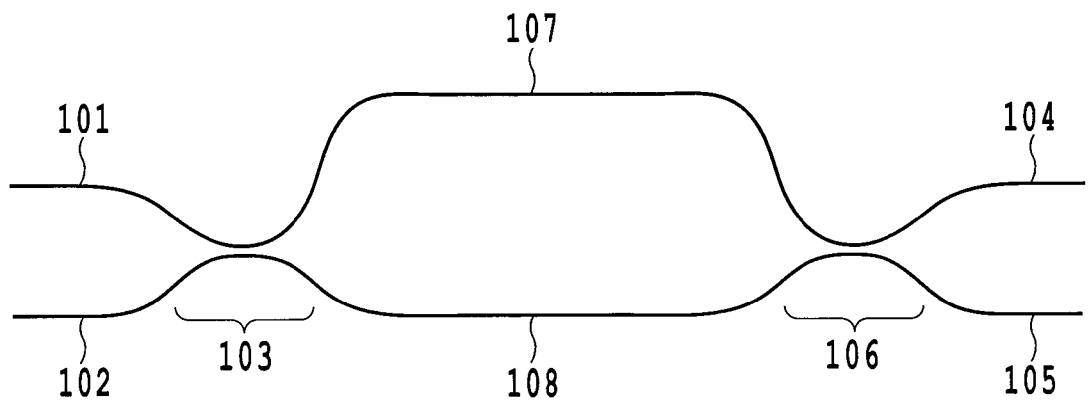
FIG. 1 is a diagram of configuration of an asymmetric Mach-Zehnder interferometer.
Figure 2A:
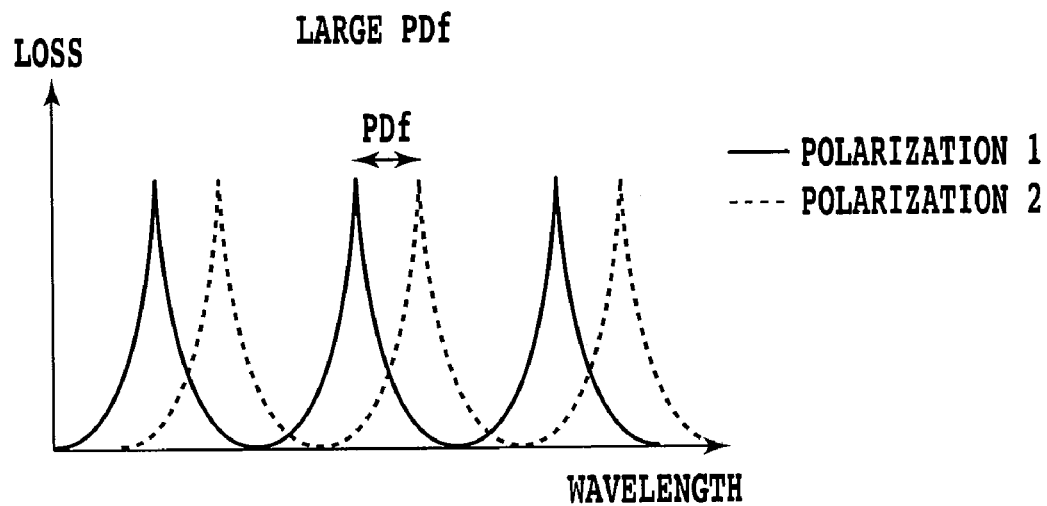
FIG. 2A is a graph explaining loss spectrum and PDf of the asymmetric Mach-Zehnder interferometer.
Figure 2B:
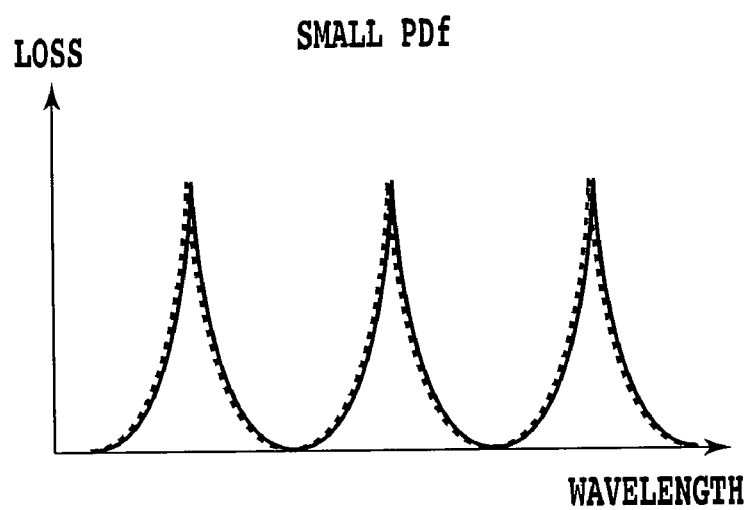
FIG. 2B is a graph explaining loss spectrum and PDf of the asymmetric Mach-Zehnder interferometer.
Figure 3:
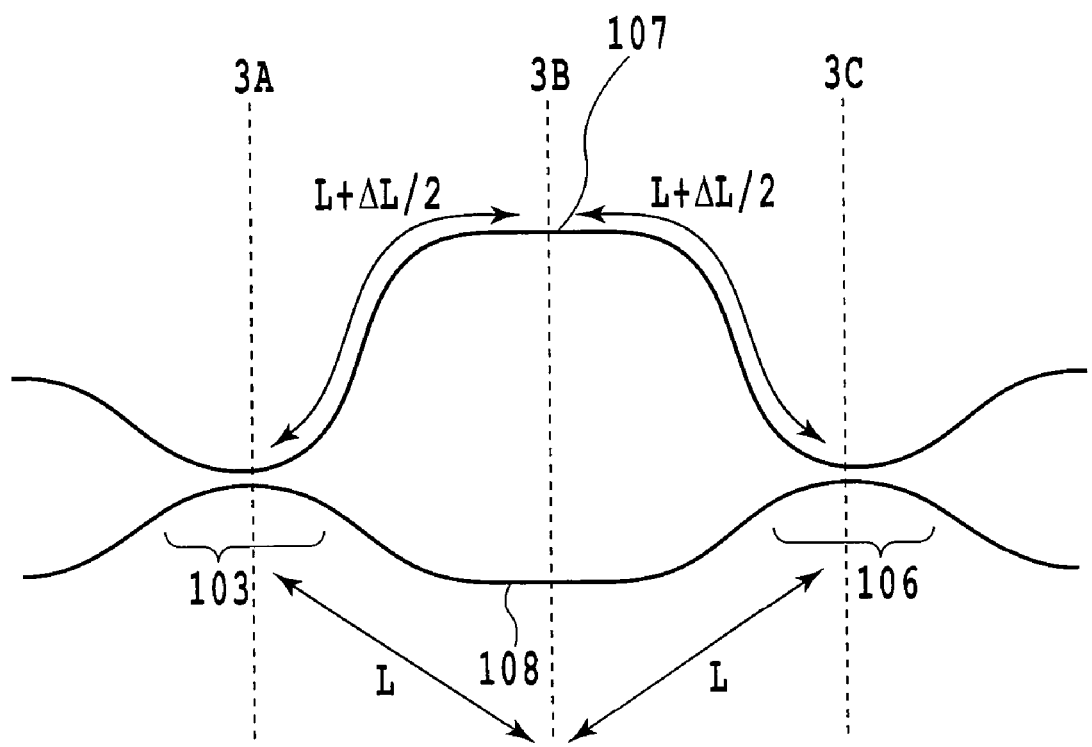
FIG. 3 is a diagram of configuration of the asymmetric MZI.
Figure 4:
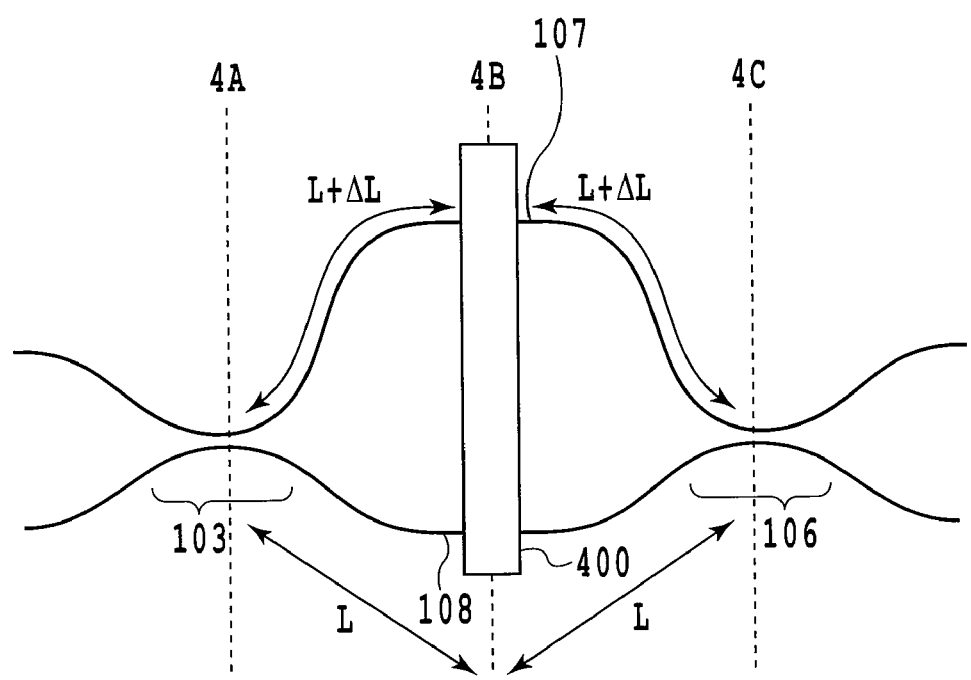
FIG. 4 is a diagram of configuration of the asymmetric MZI having a half-wave plate interposed therein according to a conventional art.
Figure 5A:
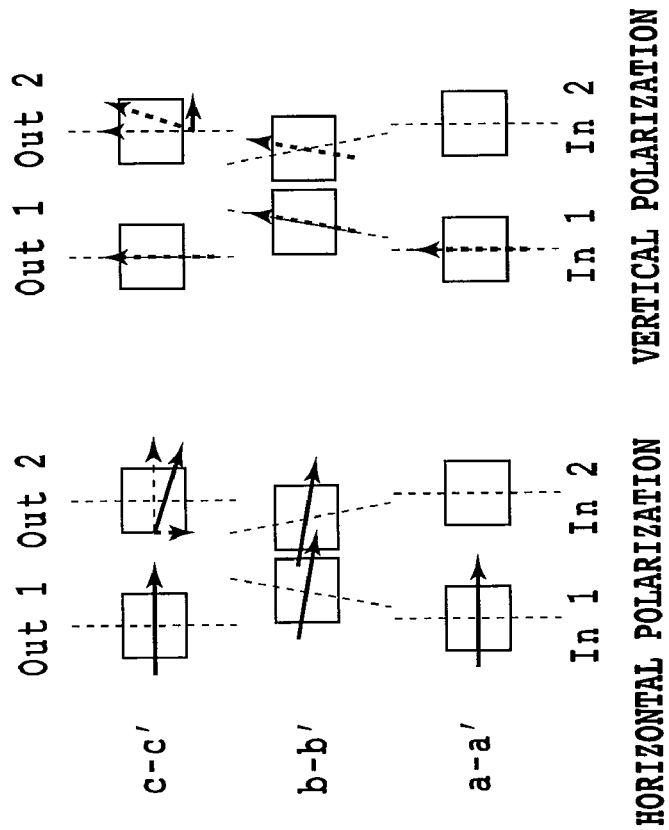
FIG. 5A is a view explaining the configuration of a directional coupler.
Figure 5A:
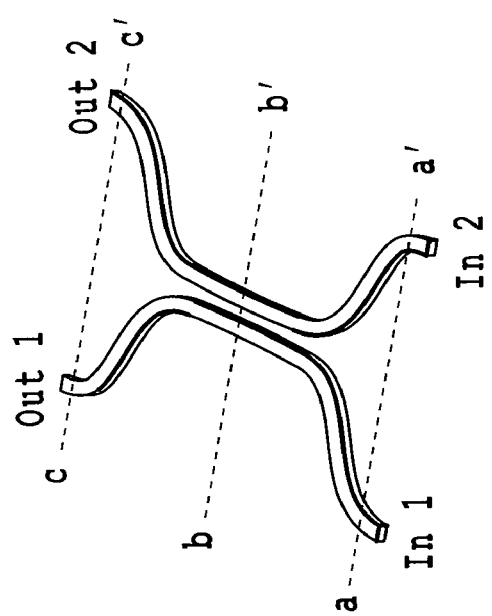

Polarization dependence of an optical circuit resulting from polarization coupling in a directional coupler or the like develops, since light induced by polarization coupling causes interference on a different condition from original interference conditions for normal light. Therefore, in the present invention, a polarization rotator that effects any one of 90° rotation and −90° rotation of all states of polarization is placed in the optical circuit thereby to provide a match between an interference condition for light induced by polarization coupling produced in the directional coupler or the like and an interference condition for the normal light. Even if the light induced by polarization coupling is produced, the interference characteristics of the optical circuit do not change and the polarization dependence is eliminated, since the interference condition for the light induced by polarization coupling matches the interference condition for the normal light. The polarization rotator has to not only control the interference condition for the light induced by polarization coupling as mentioned above, but also eliminate polarization dependence resulting from an optical path difference between paths of light propagating through the interferometer. Thus, the position of interposition of the polarization rotator is such that the integral value of birefringence along each propagation path is half the integral value of all paths. Detailed description will be given below with regard to the configuration and operation of a polarization-independent waveguide-type optical interferometer according to the present invention. Description will be given with an asymmetric MZI, which is a typical optical interferometer, taken as an example.

An electric field of light passing through the polarization rotator that effects 90° rotation of light in all states of polarization is expressed by Equation (6):

[formula 6]

$$E = \begin{pmatrix} \cos(90°) & \sin(90°) \\ -\sin(90°) & \cos(90°) \end{pmatrix} \begin{pmatrix} E_{TE} \\ E_{TM} \end{pmatrix} \quad \text{Equation (6)}$$
$$= \begin{pmatrix} 0 & 1 \\ -1 & 0 \end{pmatrix} \begin{pmatrix} E_{TE} \\ E_{TM} \end{pmatrix}$$
$$= \begin{pmatrix} E_{TM} \\ -E_{TE} \end{pmatrix}$$

where $E_{TE}$ and $E_{TM}$ denote horizontal polarization and vertical polarization components, respectively, of an input electric field. On the other hand, an electric field of light passing through the half-wave plate used in the conventional art 2 is expressed by Equation (7):

[formula 7]

$$E = \begin{pmatrix} 0 & 1 \\ 1 & 0 \end{pmatrix} \begin{pmatrix} E_{TE} \\ E_{TM} \end{pmatrix} \quad \text{Equation (7)}$$
$$= \begin{pmatrix} E_{TM} \\ E_{TE} \end{pmatrix}$$

As can be seen from Equations (6) and (7), in any of these cases, the electric field components of the light change places between the horizontal polarization and the vertical polarization. In the conventional art 2, the conversion function of the half-wave plate is used to eliminate the polarization dependence resulting from the optical path difference between two arm waveguides as expressed by Equations (3) and (4).

As opposed to this, in the optical interferometer according to the present invention, the polarization rotator that effects 90° rotation of light in all states of polarization not only changes the places of the electric field components of the light between the horizontal polarization and the vertical polarization, but also changes the sign of the electric field. The change in the sign means that there is a phase difference of 180° between these polarizations. In other words, the polarization rotator has the function of rendering the optical path difference between the two arm waveguides polarization-independent, which is performed by the half-wave plate, and the function of providing the phase difference between two polarizations. The polarization mode converter used in the conventional art 2 does not effect such a change in the sign of the electric field between the polarizations.

Figure 7B:
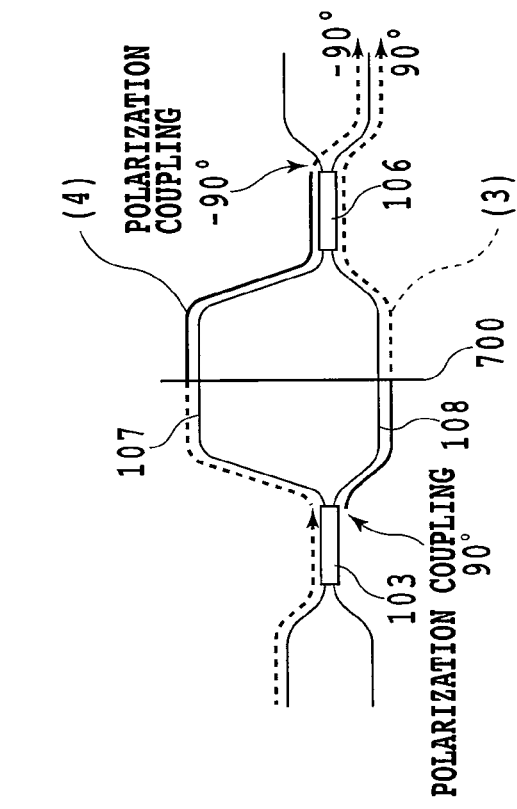
FIG. 7B is a diagram explaining propagating light of types 3 and 4 in the optical circuit according to the conventional art.
Figure 7A:
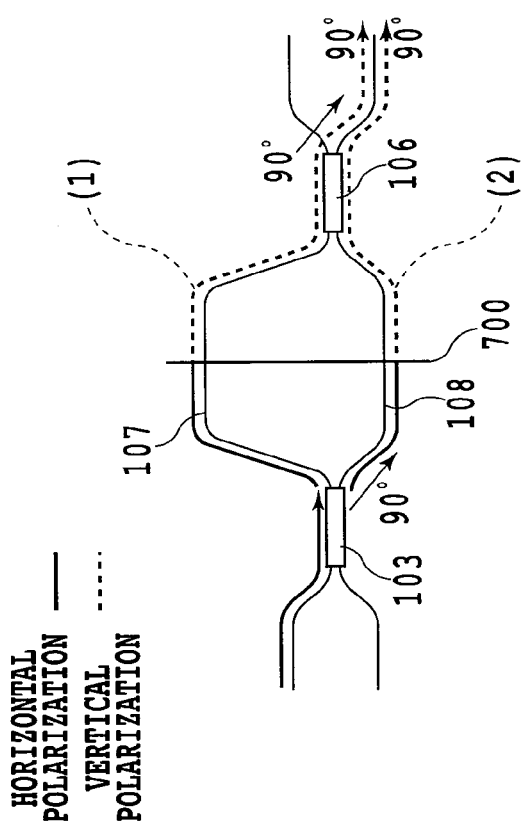
FIG. 7A is a diagram explaining propagating light of types 1 and 2 in an optical circuit according to the conventional art.
Figures 8A, 8B:
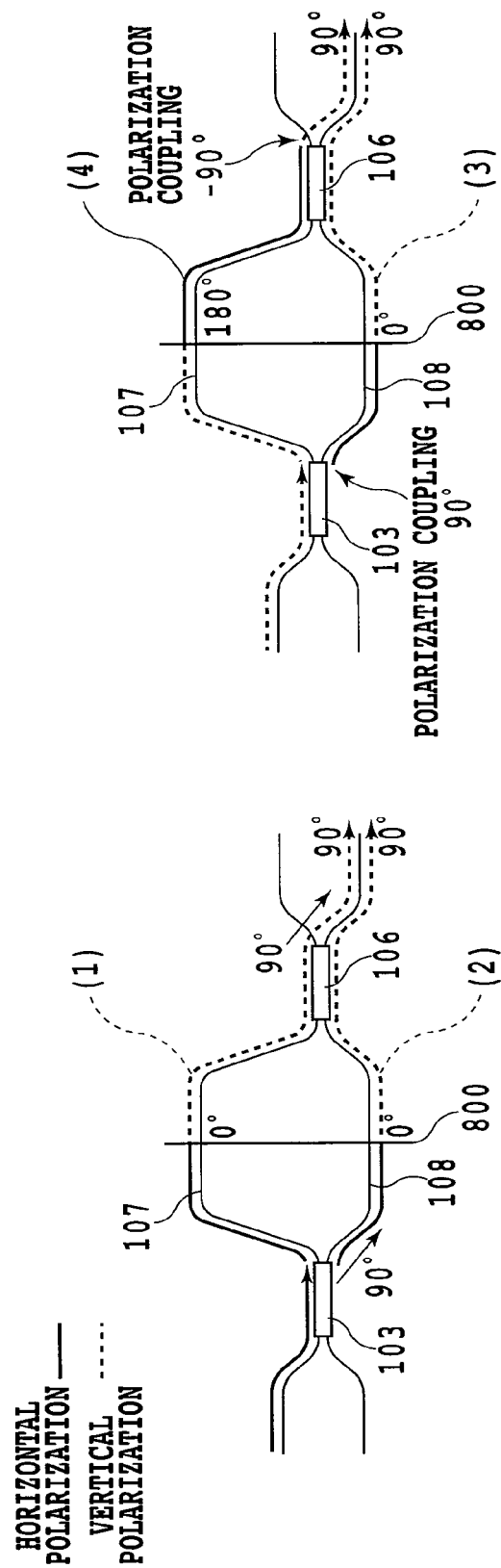
FIG. 8A is a diagram explaining the propagating light of the types 1 and 2 in an optical circuit according to the present invention.
FIG. 8B is a diagram explaining the propagating light of the types 3 and 4 in the optical circuit according to the present invention.

FIGS. 8A and 8B are diagrams showing propagating light in the asymmetric MZI having the polarization rotator of the present invention interposed therein. The propagating light corresponds to the four types of propagating light described with reference to FIGS. 7A and 7B. The configuration of the asymmetric MZI is the same as shown in FIGS. 7A and 7B, and a polarization rotator 800, in place of the half-wave plate, is placed at the midpoint between the two arm waveguides 107 and 108. Even if the polarization rotator 800 is interposed, it is required that the optical path difference between the two arm waveguides 107 and 108 be made polarization-independent. Thus, it is required that the polarization rotator 800 be placed at a location such that the integral value of birefringence along propagation paths containing the arm waveguides 107 and 108 is half the integral value for all paths. If each waveguide is formed of the waveguide of uniform structure and also a circuit pattern has a symmetric geometry between an input and an output, the polarization rotator is placed just at the center of the interferometer.

FIG. 8A shows the propagating light as the normal light of the above-mentioned types 1 and 2, and corresponds to FIG. 7A. FIG. 8B shows the propagating light as the light induced by polarization coupling of the above-mentioned types 3 and 4, and corresponds to FIG. 7B. The behavior of the coupled light of the types 1 to 4 is different from that shown in FIGS. 7A and 7B in that, when the polarization rotator performs the polarization coupling between the horizontal polarization and the vertical polarization, the polarization rotator 800 provides a phase difference of 180°. Specifically, the propagating light of the types 3 and 4 shown in FIG. 8B is in the vertically polarized and horizontally polarized states, respectively, immediately before the polarization rotator 800, and thus, is provided with a phase difference of 180° during passing through the polarization rotator 800.

By the polarization rotator providing a phase difference of 180°, the phase of the propagating light of the type 4 at the through port in FIG. 8B is 90°, which is the same as that of the propagating light of the type 3. Therefore, the four types of propagating light is provided with the phase difference (sign change) by the polarization rotator, and thereby, in-phase interference occurs regardless of the interference of the normal light or the interference of the light induced by polarization coupling. Even if the polarization coupling occurs in the directional coupler or the like, the interference condition for the normal light is the same as that for the light induced by polarization coupling, and thus, the polarization dependence of the interferometer does not develop. The polarization rotator operates not only to eliminate the polarization dependence resulting from the optical path difference between the arm waveguides that form the interferometer, but also to provide a match between the interference condition for the light induced by polarization coupling and the interference condition for the normal light.

Allowing for the above-mentioned operation of the polarization rotator, the transmission spectrum of the cross port is expressed by Equation (8):

[formula 8]

$$Trans = |E|^2 \quad \text{Equation (8)}$$
$$= \left| \sqrt{1-\varepsilon}\sqrt{1-\kappa_p}\left(\begin{matrix} e^{-ik(L+\delta L)-i\frac{\pi}{2}} + \\ e^{-ikL-i\frac{\pi}{2}} \end{matrix}\right) + \sqrt{\varepsilon}\cdot\sqrt{\kappa_p}\,e^{-i\phi}\left(e^{-ik(L+\delta L)-i\frac{\pi}{2}} + e^{-ikL+i\frac{\pi}{2}}\right)\right|^2$$
$$= A''(\varepsilon, \kappa_p, \phi)(1 + \cos(k \times \delta L))$$

Comparison between Equation (8) representing the transmission spectrum of the interferometer according to the present invention and Equation (5) representing the transmission spectrum of the conventional art 2 shows that indices of e (a base of natural log) of the fourth term are different. According to Equation (8), a factor A" does not contain the wave number k. Further, an argument of the COS function does not contain a variable associated with the state of horizontal polarization and vertical polarization of input polarization, such as $\phi$ or $\epsilon$. The argument of the COS function is a constant, and thus, the transmission spectrum in the form of the COS function is constant regardless of the state of polarization of incoming light. Therefore, a shift in the spectrum along the wavelength axis (or the frequency axis) does not occur, and PDf does not occur as distinct from Equation (5). Strictly speaking, the factor A" contains a phase difference p between the horizontal polarization component and the vertical polarization component of the input polarization, and thus, input polarization dependence, that is, polarization dependence loss, remains in the transmission spectrum. However, the amount of contribution by the factor A" is sufficiently small, and thus present no problem in practical use.

According to the present invention, as described above, even if the polarization coupling occurs in the directional coupler or the like, the polarization rotator can be placed in the interferometer thereby to provide a match between the interference condition for the light induced by polarization coupling and the interference condition for the normal light. Thus, the light induced by polarization coupling does not affect the interference condition for the interferometer taken as a whole. This eliminates the polarization dependence of the transmission spectrum depending on the state of input polarization, and thus prevents the occurrence of the PDf.

Materials that operate as the polarization rotator include a garnet material and quartz that exhibits a Faraday effect. Liquid crystal or the like may also be used. However, it is required that an electric field, a magnetic field or the like be applied to these materials. Meanwhile, an element made of any of these materials is thick, and thus, if the element is interposed in the waveguide, great loss can possibly occur. Therefore, by referring to the following specific embodiments, description will be given with regard to a simpler method for implementing the polarization rotator. A half-wave plate made of a polyimide-base material is used to implement the polarization rotator. Since the half-wave plate in itself is a simple birefringent material, the half-wave plate does not operate as the polarization rotator. By referring to a first embodiment, description will be given with regard to a method for implementing the polarization rotator, which involves using two half-wave plates, and varying an angle of combination of these half-wave plates. By referring to a second embodiment, description will be given with regard to a method for implementing the polarization rotator, which involves using a combination of one half-wave plate and a waveguide having birefringence properties.

First Embodiment

Figure 9:
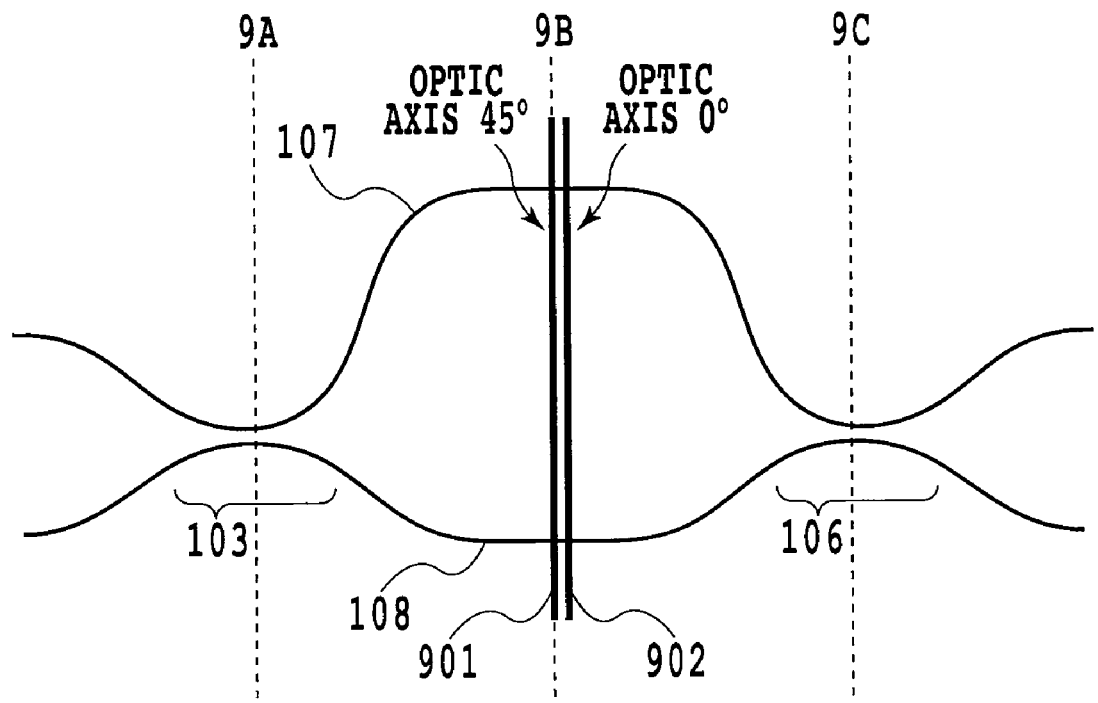
FIG. 9 is a diagram of configuration of an optical circuit according to a first embodiment of the present invention.

FIG. 9 is a diagram showing a waveguide-type optical interferometer according to the first embodiment of the present invention. An asymmetric MZI is configured by including an optical splitter 103 and an optical combiner 106 having a splitting ratio of 50%, and the two arm waveguides 107 and 108 of different lengths that provide a connection between the optical splitter 103 and the optical combiner 106. The long arm waveguide 107 and the short arm waveguide 108 are each formed of a multimode interference waveguide (MMI) and are birefringent. In the asymmetric MZI, a length between the two arm waveguides is adjusted so that FSR is 21 GHz. In the first embodiment, the polarization rotator is configured of a combination of two half-wave plates, that is, a first half-wave plate whose optic axis is inclined at 45° relative to the optic axes of the waveguides, and a second half-wave plate whose optic axis is parallel to the optic axes of the waveguides. Hereinafter, in order to distinguish between these two half-wave plates having different functions, the second half-wave plate having the parallel or horizontal optic axis will be particularly called "retarder," and the first half-wave plate having the optic axis inclined at 45° will be literally called "half-wave plate."

When the half-wave plate and the retarder are placed adjacent to each other in a path in the waveguide, the horizontal polarization component $E_{TE}$ and the vertical polarization component $E_{TM}$ are transformed as expressed by Equation (9).

[formula 9]

$$E = \text{half-wave plate} * \text{retarder} * \begin{pmatrix} E_{TE} \\ E_{TM} \end{pmatrix} \quad \text{Equation (9)}$$
$$= \begin{pmatrix} 0 & 1 \\ 1 & 0 \end{pmatrix} \begin{pmatrix} 1 & 0 \\ 0 & -1 \end{pmatrix}$$
$$= \begin{pmatrix} E_{TE} \\ E_{TM} \end{pmatrix}$$
$$= \begin{pmatrix} \cos(90°) & \sin(90°) \\ -\sin(90°) & \cos(90°) \end{pmatrix} \begin{pmatrix} E_{TE} \\ E_{TM} \end{pmatrix}$$

As can be seen from Equation (9), the combination of the retarder and the half-wave plate operates as the polarization rotator that effects 90° rotation of polarization.

Referring again to FIG. 9, the above-mentioned combination of the retarder and the half-wave plate is interposed in the optical paths of the two arm waveguides of the asymmetric MZI. The position of interposition is such that the combination is placed at a midpoint 9B of a first optical path that is split by the optical splitter 103 and propagates through the long arm waveguide 107 and to the optical combiner 106 and at a midpoint 9B of a second optical path that is split by the optical splitter 103 and propagates through the short arm waveguide 108 and to the optical combiner 106. The optical path difference between the long arm waveguide 107 and the short arm waveguide 108 is polarization-independent in the same manner as expressed by Equations (3) and (4) for the conventional art 2 having the half-wave plate singly interposed.

Further, detailed description will be given with regard to the position of placement of the retarder and the half-wave plate. As shown in FIG. 9, if a circuit configuration is such that the circuit geometry of the asymmetric MZI is symmetric about a broken line 9B, a half-wave plate 901 is placed on the broken line 9B, and a retarder 902 is placed in the vicinity of the half-wave plate 901. The position of interposition of the retarder 902 is not particularly limited, provided that the position falls within a range from 9A to 9C in the two arm waveguides in the asymmetric MZI. It is to be noted that the position of placement of the retarder is not limited, provided that the retarder lies in the waveguide that gives the optical path difference that produces interference characteristics inherent in the optical interferometer. Specifically, the retarder may be placed anywhere in the arm waveguide, provided that it performs the function of providing a phase difference of 180° between horizontal polarization and vertical polarization. The half-wave plate and the retarder are placed as mentioned above, and thereby, the optical path difference between the arm waveguides 107 and 108 is constant regardless of the state of polarization, and also, a phase difference of 180° between the horizontal and vertical polarization components whose polarization axes cross at right angles is provided.

Meanwhile, a combination of plural retarders, not one retarder, may be used to implement the polarization rotator. For example, the amount of phase difference provided by each retarder is set to a quarter wavelength (90°, and two quarter-wave retarders may be used to implement the polarization rotator. In this instance, the polarization rotator is configured of a total of three elements: the half-wave plate and the two retarders.

The circuit was actually fabricated and PDf evaluation was made, by use of the configuration in which the half-wave plate and the retarder are interposed. A silica glass waveguide was fabricated on a silicon substrate by flame hydrolysis deposition and reactive ion etching. A core has a cross section of 4.5 µm square and has a relative refractive-index difference of 1.5%. The core was buried beneath overcladding glass of 30 µm thick. The optical path difference between the long arm waveguide and the short arm waveguide was set so that FSR was 21 GHz. The MMIs were used to form the optical splitter and the optical combiner. A groove (having a width of 20 µm and a depth of 100 µm) was formed by a dicing saw or etching at the midpoint of the short arm waveguide and at the midpoint of the long arm waveguide. Polyimide films having a thickness of a few tens of micrometers were used for the half-wave plate and the retarder, were cut so that the optic axes were 45° and 0°, respectively, and were inserted into the formed groove.

Figure 10A:
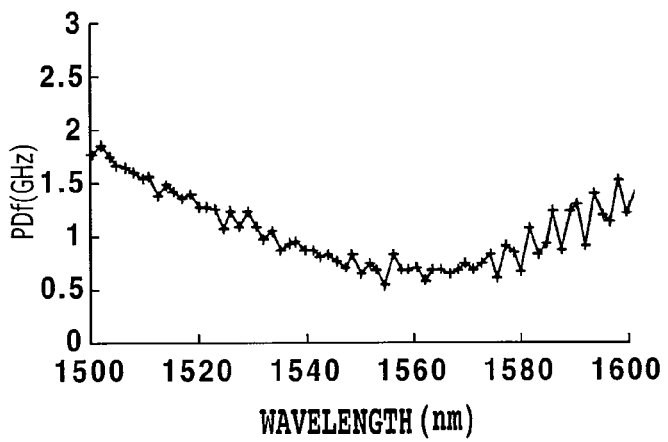
FIG. 10A shows measured values representing PDf wavelength dependence of an optical circuit that does not include a polarization rotator.
Figure 10B:
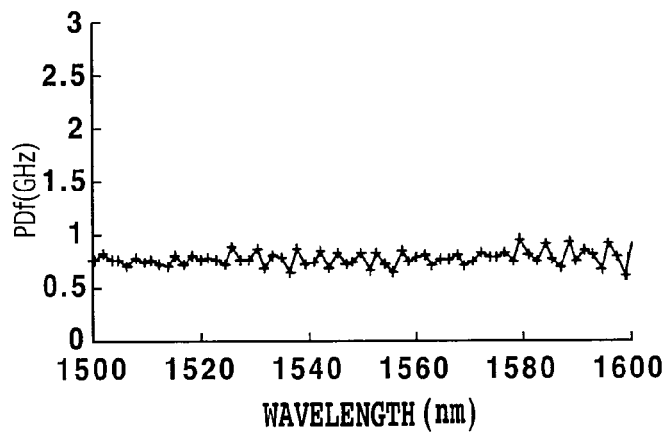
FIG. 10B shows measured values representing the PDf wavelength dependence of an optical circuit including a half-wave plate.
Figure 10C:
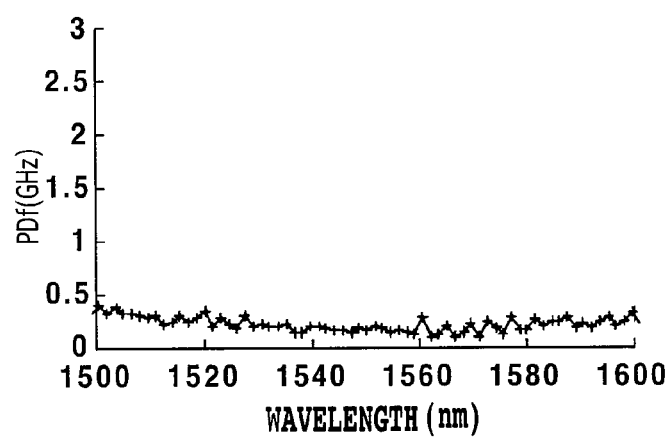
FIG. 10C shows measured values representing the PDf wavelength dependence of an optical circuit including a polarization rotator according to the first embodiment.

FIGS. 10A to 10C are graphs showing the measured results of characteristics of the fabricated waveguide-type optical interferometer (the asymmetric MZI) according to the present invention, in conjunction with the measured results of the interferometer according to the conventional art. Under three different conditions, wavelength dependence of the PDf of the interferometers was measured. FIG. 10A shows the measured results of the fabricated asymmetric MZI having nothing interposed therein; FIG. 10B, the asymmetric MZI having the half-wave plate alone interposed therein according to the conventional art; and FIG. 10C, the asymmetric MZI having the polarization rotator (i.e., the half-wave plate and the retarder) according to the first embodiment interposed therein. When the polarization rotator according to the present invention is interposed (FIG. 10C), the PDf is 0.5 GHz or less over the entire wavelength band, and it can be seen that the excellent effect of reducing the PDf value to about half or less is achieved, as compared to the conventional art (FIG. 10B).

Figure 11:
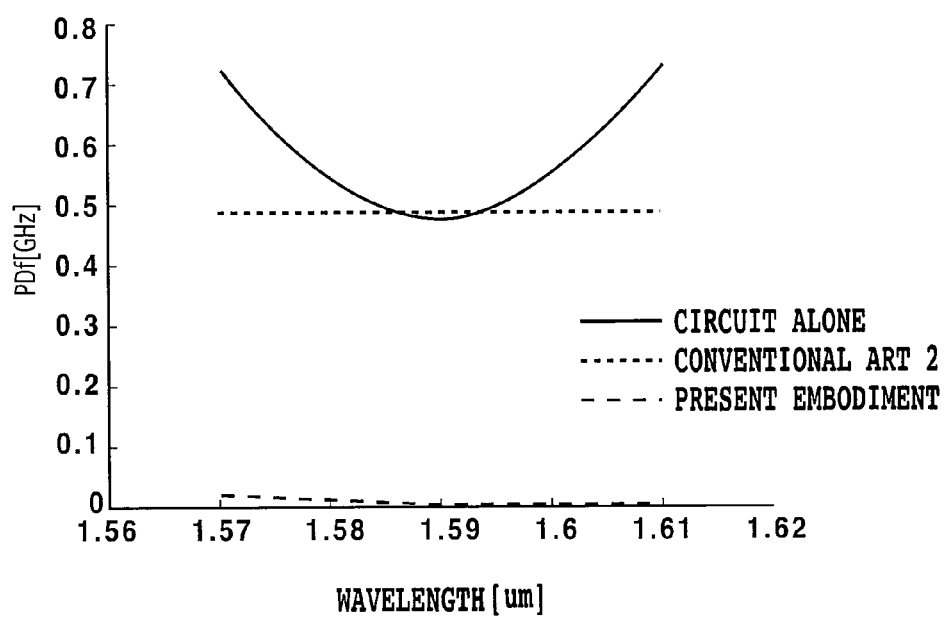
FIG. 11 is a graph showing the wavelength dependence (calculated values) of the PDf of the asymmetric MZI.

FIG. 11 is a graph showing the calculated results of PDf of an asymmetric Mach-Zehnder interferometer. Numerical calculation is more precise calculation performed allowing for the polarization dependence of the half-wave plate and the retarder, the polarization coupling in a through direction and in a cross direction in the optical splitter and the optical combiner, or the like, in addition to parameters which calculation of the above Equation (5) or (8) or the like allows for. As specific parameters, the birefringence of the waveguide is set to $3.5*10^{-4}$, and the operating wavelength for the half-wave plate and the retarder is set to 1.59 µm.

In the case of the interferometer alone containing nothing such as the half-wave plate or the retarder, the PDf has a large value of a few tens of GHz, and moreover, the wavelength dependence is great. Even if the shape of the waveguide or the like designed to control the birefringence in order to minimize the PDf, the PDf is present as shown in FIG. 11. In the case of the configuration of the conventional art 2 (in which the half-wave plate alone is interposed at the center of the interferometer), the value of the PDf is reduced to about 0.5 GHz, but the PDf still remains. As opposed to this, when the polarization rotator according to the first embodiment (i.e., the combination of the half-wave plate and the retarder) is used, the PDf has a very small value of 0.007 GHz. The calculated results shown in FIG. 11 reflect well the experimental values shown in FIGS. 10A to 10C, and the advantageous effect of the present invention can be seen theoretically.

The PDf required for practical use is about 1/100 of the FSR. In the circuit according to the first embodiment, the FSR is 21 GHz, and thus, the PDf is required to be 0.2 GHz or less. According to the experimental values shown in FIGS. 10A to 10C, the conventional art has difficulty in satisfying the above-mentioned condition; however, the first embodiment can satisfy the above-described condition of 0.2 GHz or less.

Incidentally, by referring to the above-mentioned first embodiment, description has been given taking as an example the retarder whose optic axis is parallel to the optic axes of the waveguides, and the half-wave plate whose optic axis is inclined at 45° relative to the optic axes of the waveguides; however, it is to be understood that the present invention is not limited thereto. Specifically, any configuration may be adopted, provided that there is a difference of 45° between the optic axes of the two half-wave plates. It is to be therefore noted that one half-wave plate having the optic axis having an angle of 15° and the other half-wave plate having the optic axis having an angle of 60° may be used in combination to form the polarization rotator.

Meanwhile, in FIG. 9, there is shown an instance where the half-wave plate and the retarder integral with each other is interposed in the two arm waveguides; however, half-wave plates and retarders may be individually interposed in the arm waveguides, respectively. In other words, the configuration may be such that a half-wave plate and a retarder are provided for the long arm waveguide and another half-wave plate and another retarder is provided for the short arm waveguide.

Second Embodiment

Figure 12:
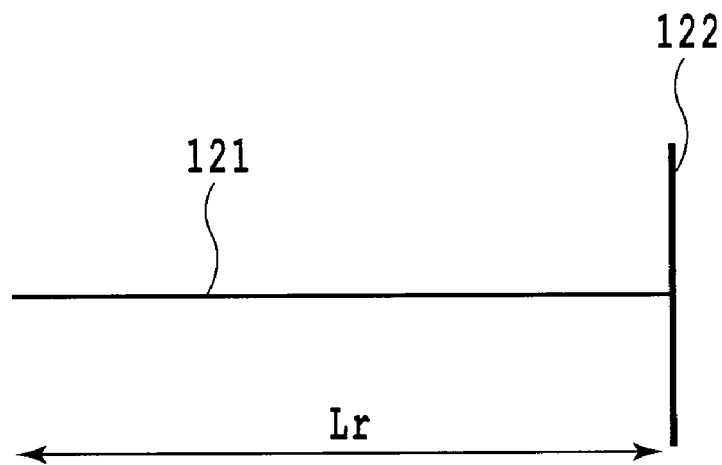
FIG. 12 is a conceptual illustration of the configuration of a polarization rotator according to a second embodiment of the present invention.

FIG. 12 is a conceptual illustration showing the configuration of a polarization rotator according to the second embodiment, which implements the waveguide-type optical interferometer of the present invention. A different method from the first embodiment is used for the configuration in which the polarization rotator is implemented. The second embodiment is characterized in that a waveguide 121 having birefringence is placed on one side of a half-wave plate 122 thereby to operate the polarization rotator. Specifically, the waveguide may be designed so that the waveguide 121 in itself having the birefringence performs the function of providing the phase difference between vertical and horizontal polarizations, as in the case of the retarder described with reference to the first embodiment. The waveguide 121 corresponding to the retarder is configured in the interferometer, and thereby, the elimination of the polarization dependence of the interferometer can be achieved by the phase difference providing function of the waveguide.

To determine the configuration of the waveguide 121 corresponding to the retarder, the birefringence $B_r$ of the waveguide and the waveguide length $L_r$ thereof are important. Specifically, it is required that the product of the birefringence $B_r$ and the waveguide length $L_r$ of the waveguide be equal to a length of ½ of the wavelength used in the interferometer (which is equivalent to the provision of a phase difference of) 180°. In other words, the relationship expressed by Equation (10) has to hold.

[formula 10]

$$Br*Lr=\lambda_0/2+\lambda_0*m \qquad \text{Equation (10)}$$

When the birefringence $B_r$ and the wavelength $\lambda_0$ used in the interferometer are determined, $L_r$ is determined. When Equation (10) is replaced by an equation of $L_r$, Equation (11) is obtained.

[formula 11]

$$Lr = \lambda_0 * (\tfrac{1}{2} + m)/Br \quad \text{Equation (11)}$$

Here, if the variable m is an integer, $L_r$ is equivalent to a length of ½ of the wavelength used in the interferometer, and thus, an infinite number of optimum values are present.

Figure 13:
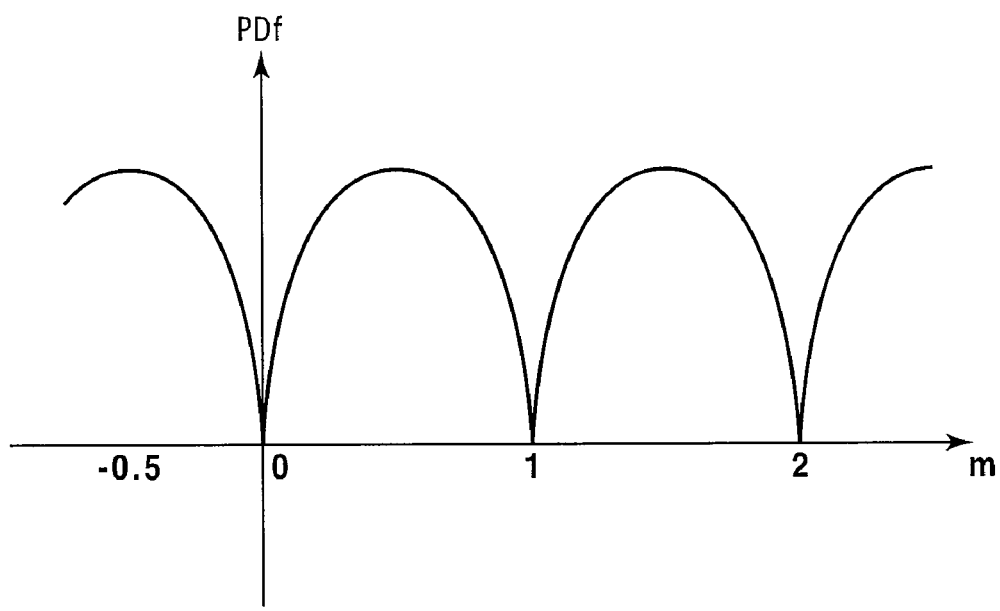
FIG. 13 is a graph showing m dependence of the PDf in the configuration according to the second embodiment.

FIG. 13 is a graph showing the variable-m dependence of the PDf in the asymmetric MZI. The relationship between the variable m and the PDf is obtained, on the basis of the same approach as Equation (5) (corresponding to m=−½) and Equation (8) (corresponding to m=1). As is apparent from FIG. 13, the PDf is the minimum when m is an integer. However, it can be seen that, even if m has a value in the vicinity of the integer, the advantageous effect of considerably reducing the PDf is achieved. Meanwhile, it is desirable that m=0 in Equation (11), allowing for the wavelength dependence of the PDf, miniaturization of the interferometer, or the like. Here, as for the method according to the conventional art 2, the half-wave plate is placed at the center of the circuit. This corresponds to an instance where m=−½ in Equation (11), and thus, $L_r=0$. As can be seen from FIG. 13, when m=−½, the PDf has a maximum value, so that the worst condition for the variable m results, if allowing for the interference by the light induced by polarization coupling.

Analytical discussion will be given with regard to the function of the waveguide 121 having the birefringence properties corresponding to the retarder and the half-wave plate 122, for the polarization rotator according to the second embodiment. If m is an integer value, the function of the polarization rotator for the horizontal polarization component and the vertical polarization component is expressed by Equation (12):

[formula 12]

$$E = \text{half-wave plate} * \text{birefringent waveguide} * \quad \text{Equation (12)}$$

$$\begin{pmatrix} E_{TE} \\ E_{TM} \end{pmatrix}$$

$$= \begin{pmatrix} 0 & 1 \\ 1 & 0 \end{pmatrix} \begin{pmatrix} \exp(-i\delta/2) & 0 \\ 0 & \exp(i\delta/2) \end{pmatrix} \begin{pmatrix} E_{TE} \\ E_{TM} \end{pmatrix}$$

$$= \begin{pmatrix} 0 & 1 \\ 1 & 0 \end{pmatrix} \begin{pmatrix} \exp(-i \cdot BrLr \cdot 2\pi/2\lambda) & 0 \\ 0 & \exp(i \cdot BrLr \cdot 2\pi/2\lambda) \end{pmatrix}$$

$$\begin{pmatrix} E_{TE} \\ E_{TM} \end{pmatrix}$$

$$\equiv \begin{pmatrix} 0 & 1 \\ 1 & 0 \end{pmatrix} \begin{pmatrix} -i & 0 \\ 0 & i \end{pmatrix} \begin{pmatrix} E_{TE} \\ E_{TM} \end{pmatrix}$$

$$= i \begin{pmatrix} \cos(90°) & \sin(90°) \\ -\sin(90°) & \cos(90°) \end{pmatrix} \begin{pmatrix} E_{TE} \\ E_{TM} \end{pmatrix}$$

where $E_{TE}$ and $E_{TM}$ denote the horizontal polarization and vertical polarization components, respectively. From Equation (12), it can be seen that a combination of the waveguide 121 having the birefringence properties and the half-wave plate 122 operates as the polarization rotator that effects 90° rotation of the horizontal polarization component and the vertical polarization component.

Figure 14A:
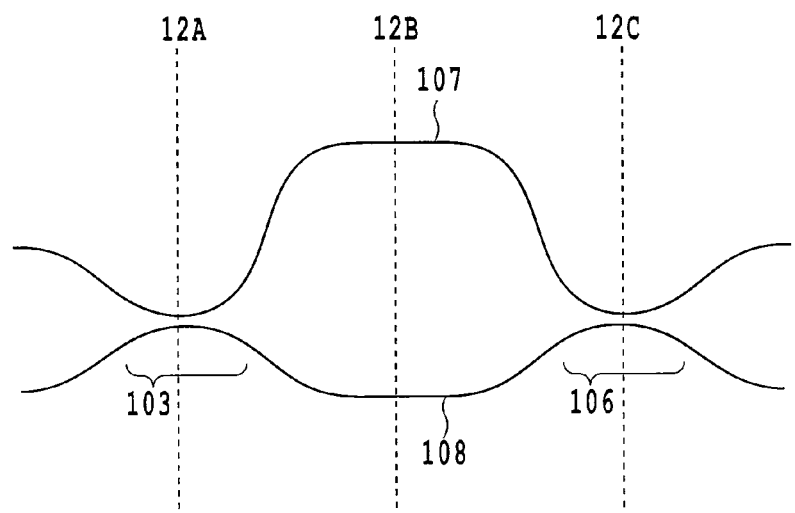
FIG. 14A is a diagram explaining the configuration of the asymmetric MZI before the interposition of the polarization rotator according to the second embodiment.
Figure 14B:
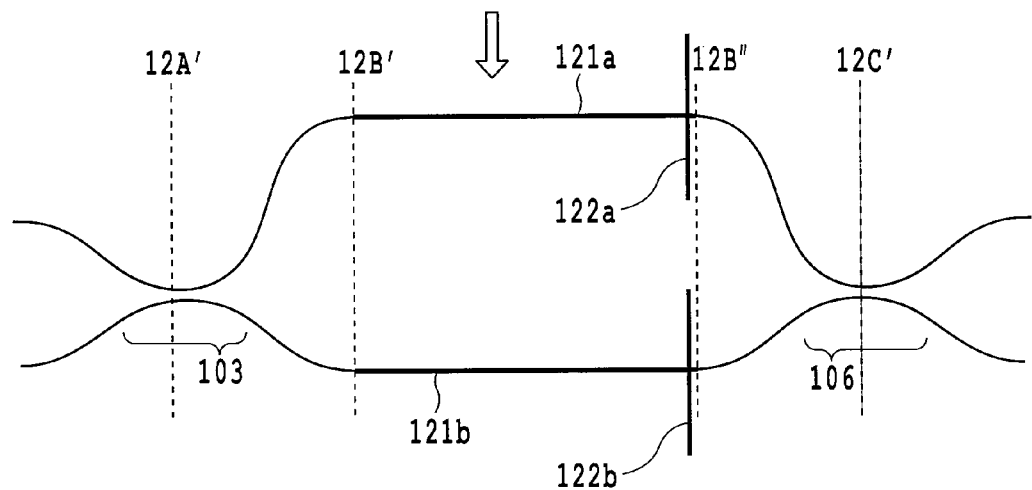
FIG. 14B is a diagram of configuration of the asymmetric MZI having the polarization rotator according to the second embodiment interposed therein.

FIGS. 14A and 14B are diagrams showing the configuration of the asymmetric MZI using the polarization rotator according to the second embodiment. FIG. 14A shows the asymmetric MZI before the interposition of the polarization rotator, and FIG. 14B shows that after the interposition. As shown in FIG. 14A, the asymmetric MZI is configured by including the optical splitter 103 and the optical combiner 106 having a splitting ratio of 50%, and the two arm waveguides 107 and 108 of different lengths that provide a connection between the optical splitter 103 and the optical combiner 106. The optical splitter 103 lies on a broken line 12A, and the optical combiner 106 lies on a broken line 12C. The polarization rotator according to the second embodiment is placed at the center of the asymmetric MZI and also on the two arm waveguides 107 and 108. As employed here, the center refers to the interposition of the polarization rotator at the midpoint between regions (i.e., the region between the lines 12A and 12B and the region between the lines 12B and 12C in FIG. 14A) by which the optical path difference between the two arm waveguides of the asymmetric MZI is provided, as shown in FIG. 14A. As shown in FIG. 14B, consequently, half-wave plates 122a and 122b are placed at a location offset by $L_r/2$ with respect to the center of the asymmetric MZI, and the half-wave plates 122a and 122b are asymmetrically placed, as viewed from the asymmetric MZI as a whole.

The half-wave plates 122a and 122b may be located on either side of the waveguide 121 having the birefringence properties corresponding to the retarder. In other words, the half-wave plates 122a and 122b may be located at any of locations indicated by 12B' and 12B".

The circuit was actually fabricated and PDf evaluation was made, by use of the configuration in which the half-wave plates are placed as mentioned above. As in the case of the first embodiment, a silica glass waveguide was fabricated on a silicon substrate. A core has a cross section of 4.5 μm square and has a relative refractive-index difference of 1.5%. The core was buried beneath overcladding glass of 30 μm thick. Hereinafter, for the sake of simplicity, the waveguide having the function of providing a phase difference between polarizations by its birefringence properties, corresponding to the retarder according to the first embodiment, will be called "retarder waveguide."

Figure 15:
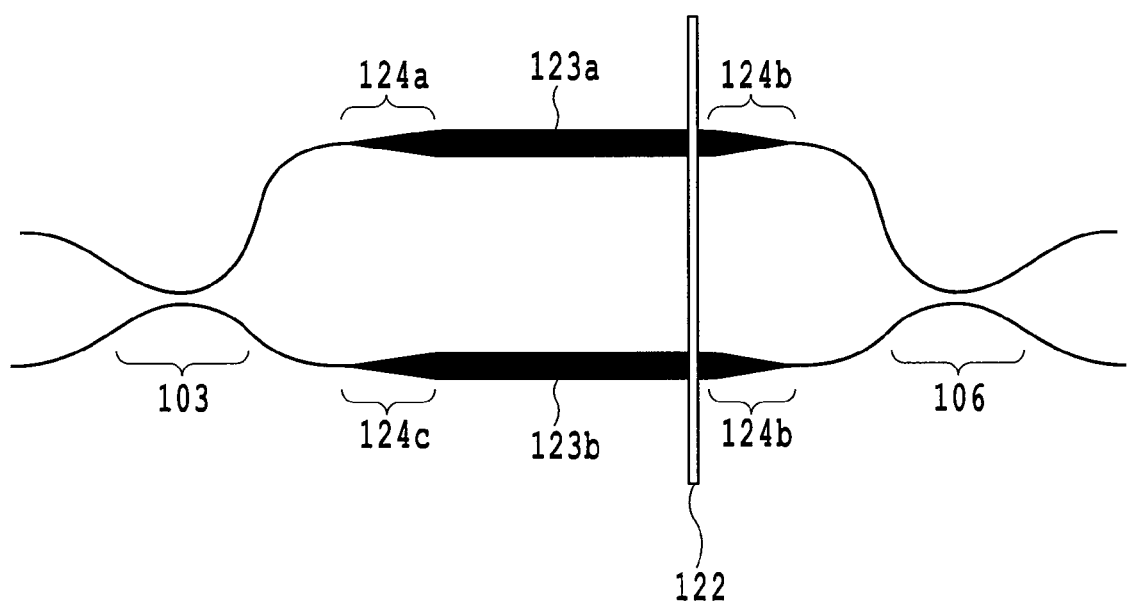
FIG. 15 is a diagram of a circuit pattern of the asymmetric MZI having the polarization rotator according to the second embodiment interposed therein.

FIG. 15 is a diagram showing a specific circuit pattern of the polarization rotator according to the second embodiment. Retarder waveguides 123a and 123b are placed substantially at the center of the circuit taken as a whole. On the other hand, the half-wave plate 122 is placed at a location offset toward the optical combiner 106 with respect to the position of a center line about which the circuit taken as a whole is symmetric, and is asymmetrically located. The retarder waveguides 123a and 123b placed at the center form wide waveguides each having a greater core width than waveguides in other locations in the optical circuit, thereby to prevent an increase in loss at the time of interposition of the half-wave plate 122.

Meanwhile, the position of interposition of the half-wave plate 122 is determined by the length of the retarder waveguides 123a and 123b and is thus affected by the birefringence of the retarder waveguides 123a and 123b. Generally, in an actual manufacturing process, a fabrication error occurs in the birefringence of the waveguide, and thus, there may arise a need for fine adjustment of the position of interposition of the half-wave plate 122. Preferably, the retarder waveguides 123a and 123b formed of the wide waveguides are provided somewhat longer than such a length that a phase difference of just 180° is provided, in order to avoid the increase in loss even if the position of interposition is changed by the fine adjustment.

When the retarder waveguides formed of the wide waveguides are set somewhat longer than the original design value, the phase difference provided by the retarder waveguides has a larger value than 180°. When the half-wave plate is placed in an endmost portion of the retarder waveguide set somewhat longer, the phase difference between the horizontal polarization and the vertical polarization becomes excessively large. However, when the half-wave plate is interposed, the sign of the provided phase difference is reversed between before and after the interposed location. Thus, even in the case of the longer retarder waveguide that provides an excessive phase difference of 180° or more taken as a whole, the half-wave plate may be interposed in the retarder waveguide in the vicinity of the end thereof thereby to adjust the provided phase difference to just 180°.

For example if the overall length of the retarder waveguide is the length equivalent to the provision of a phase difference of 190°, a long portion of the retarder waveguide corresponding to 185° and the remaining short portion of the retarder waveguide of opposite sign corresponding to 5° may be set so that the total amount of phase difference provided is 180° (=185+(−5)). In other words, even at the occurrence of the fabrication error in the manufacturing process, the retarder waveguide may be set longer than that for 180° thereby to adjust the position of interposition of the half-wave plate and thereby substantially accurately provide a phase difference of 180°. The half-wave plate can be interposed in the retarder waveguide formed of the wide waveguide, which in turn can ensure that the occurrence of loss is avoided.

Meanwhile, the retarder waveguides 123a and 123b are connected to the waveguides toward the optical splitter 103 and the optical combiner 106 by tapered waveguides 124a, 124b, 124c and 124d whose waveguide widths change gradually. The tapered waveguides provide connections between the retarder waveguides formed of the wide waveguides and the directional couplers, and thereby, the position of interposition of the half-wave plate 122 can be adjusted in the retarder waveguides without the loss increase, as mentioned above. However, it is to be noted that both the long arm waveguide and the short arm waveguide are provided with the retarder waveguides and the tapered waveguides having the same shape. The reason is that, when waveguides of different lengths or widths are placed between the two arm waveguides, the polarization dependence develops in the optical path difference between the two arm waveguides, if the position of the half-wave plate 122 is changed. Incidentally, the half-wave plate 122 of integral construction is shown in FIG. 15; however, the configuration may be such that separate half-wave plates are placed in the arm waveguides, respectively.

Figure 16:
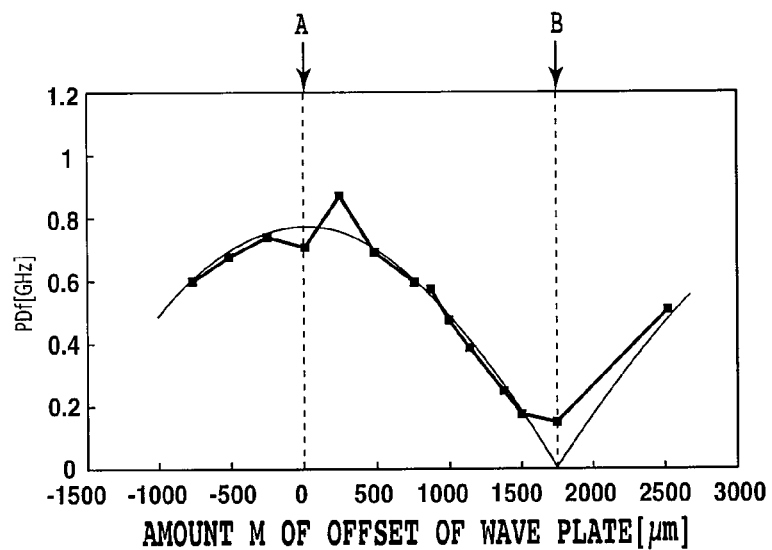
FIG. 16 is a graph showing the relationship between the PDf of the asymmetric MZI to which the second embodiment is applied, and the position of interposition of the half-wave plate.
Figure 16:
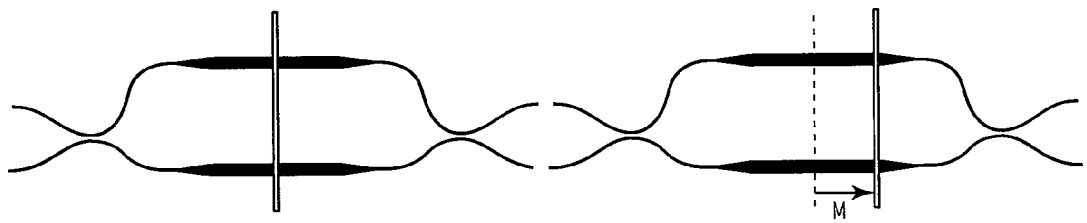

FIG. 16 is a graph showing the relationship between the PDf and the position of the half-wave plate of the asymmetric MZI to which the polarization rotator according to the second embodiment is applied. The amount M of offset of the half-wave plate indicated by the horizontal axis indicates a distance from a center point about which the asymmetric MZI circuit is symmetric, to the position of placement of the half-wave plate. In the configuration of the conventional art 2, the half-wave plate is placed at the center of the optical interferometer, and thus, this corresponds to an M=0 position in terms of the amount of offset of the half-wave plate (i.e., a position indicated by A in the graph of FIG. 16). When M=0, the PDf is about 0.7 GHz.

On the other hand, according to the configuration of the second embodiment, the half-wave plate is placed at the end of the retarder waveguide, so that the half-wave plate is asymmetrically interposed from the viewpoint of the overall configuration of the circuit. In other words, this means that, in FIG. 16, the amount M of offset of the half-wave plate is not equal to 0. In the graph of FIG. 16, the optimum value of "the amount M of offset" in the circuit according to the second embodiment is 1570 μm. As described in connection with Equations (10) and (11), the length two times "the amount M of offset" is the length $L_r$ of the retarder waveguide mentioned previously. In short, $L_r$=3140 μm is the optimum value of the length of the retarder waveguide in the circuit. As mentioned previously, the optimum value is obtained, provided that the variable m in Equation (11) is an integer, and thus, plural optimum values are present. The length $L_r$ of the retarder waveguide equal to 3140 μm is the length corresponding to the variable m equal to 0 in Equation (11). At this time, the retarder waveguide operates as the retarder according to the first embodiment.

In order to minimize the PDf as mentioned above, it is optimum that m is set to an integer. In particular when the PDf becomes the minimum with the retarder waveguide of the shortest length, m is set equal to 0 so that the retarder waveguide provides a phase difference of 180° between vertical and horizontal polarizations. However, as can be seen also from FIG. 16, the effect of reducing the PDf is fully achieved, even if the amount M of offset of the half-wave plate corresponding to the variable m of a value offset somewhat from the integer value as the optimum value is set. Discussion will now be given with regard to conditions for a phase difference β between the polarizations provided by the retarder waveguide in a more commonly used circuit configuration.

Figure 17:
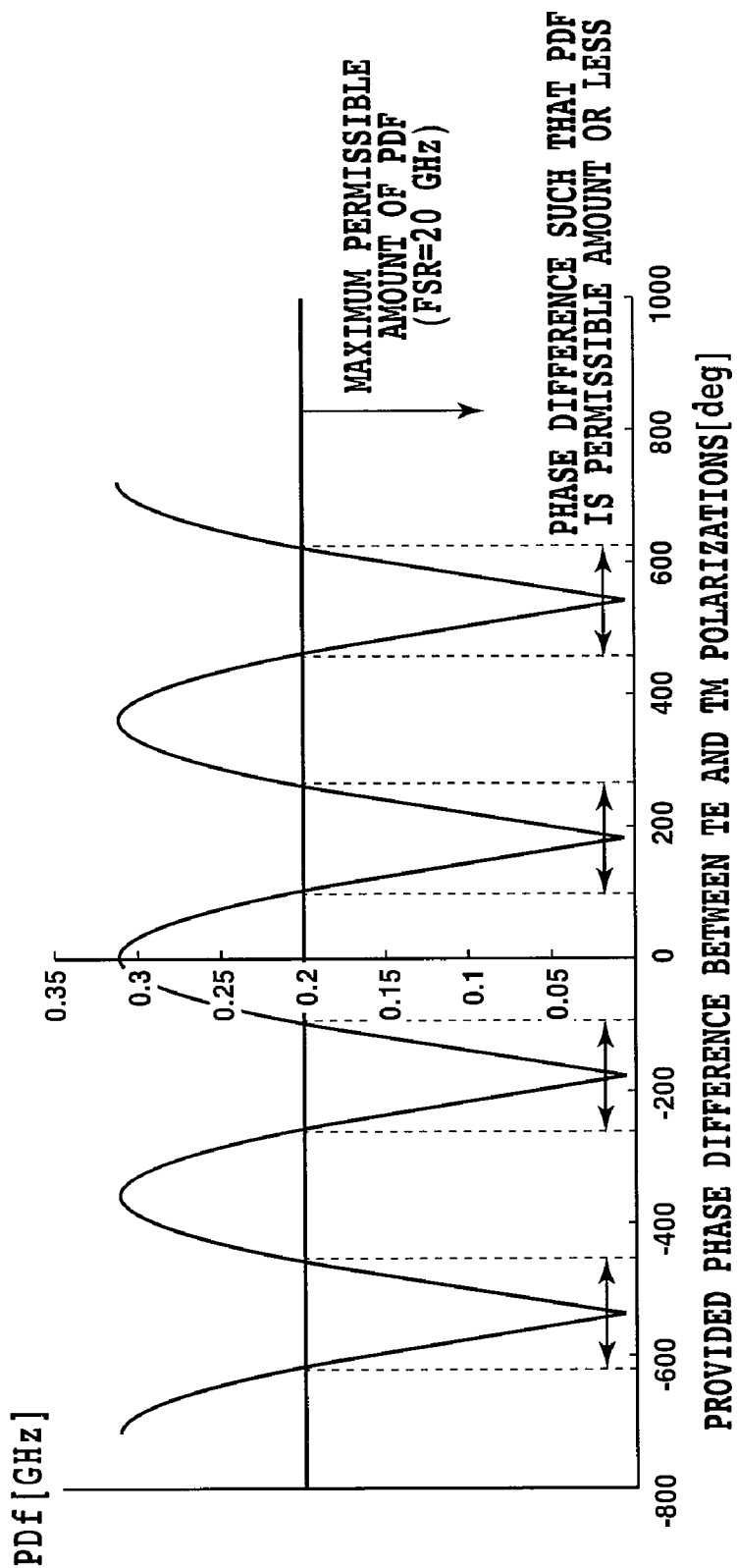
FIG. 17 is a graph showing a change in the PDf with respect to a phase difference β between polarizations provided by a retarder waveguide.

FIG. 17 is a graph showing a change in the PDf with respect to the phase difference β between the polarizations provided by the retarder waveguide. Characteristic conditions for the interferometer used for calculation of the PDf value are that FSR is set equal to 20 GHz, and the amount of polarization coupling by the optical splitter and the optical combiner is set equal to 32 dB. As shown in FIG. 17, the PDf changes periodically with the phase difference β, and likewise, phase difference conditions under which the PDf is reduced appears periodically.

Generally, it is demanded that the PDf be equal to or less than 1% of the FSR as an index of the maximum permissible amount of PDf. Discussion will be therefore given, focusing on the range of phase differences β such that the PDf is 0.2 GHz or less. The range of the amount of phase α (°) such that the PDf is 0.2 GHz or less than is the range shown by the double-headed arrow lines in FIG. 17, and is expressed by Equation (13).

$$90+360*m<\beta<270+360*m \qquad \text{Equation (13)}$$

The retarder waveguide is designed so as to obtain the range of the amount of phase β such that Equation (13) is satisfied, and thereby, the maximum permissible amount of PDf generally demanded can be satisfied. When the condition for the amount of phase expressed by Equation (13) is represented as the range of the length $L_r$ of the retarder waveguide, the condition is expressed by Equation (14):

$$\lambda_0*(0.25+m)/B_r<L_r<\lambda_0*(0.75+m)/B_r \qquad \text{Equation (14)}$$

where $B_r$ denotes the birefringence of the arm waveguide; $\lambda_0$ denotes the wavelength used in the interferometer; and m denotes an integer.

The provision of the retarder waveguide increases the size of the interferometer. Thus, actual circuit design can possibly encounter a situation where the length of the retarder waveguide having the optimum amount of phase β (that is, the variable m having an optimum integer value) such that the PDf can be minimized cannot be ensured because of limitations on a chip size, or the like. Even in such a situation, the length $L_r$ of the retarder waveguide is set to the range such that the condition expressed by Equation (14) is satisfied, and thereby, the PDf value equal to or less than 1% of the FSR can be obtained.

A further discussion will be given with regard to the location of placement of the half-wave plate. In the conventional art 2, the half-wave plate is interposed at the center of the interferometer, whereas in the second embodiment, the half-wave plate is asymmetrically interposed from the viewpoint of the interferometer taken as a whole. Further, the asymmetric position of interposition is determined depending on the birefringence of the retarder waveguide placed adjacent to the half-wave plate. An optimum value is present for the position of interposition of the half-wave plate, that is, the length of the retarder waveguide. The optimum value appears periodically as represented by Equation (11). As is apparent also from FIG. 16, the position of interposition of the half-wave plate according to the conventional art 2 is the position such that the PDf is the worst at the occurrence of the polarization coupling in the interferometer, which rather worsens the polarization dependence of the interferometer. As is the case with the second embodiment of the present invention, the half-wave plate is not placed at the center of the interferometer but is asymmetrically placed, and further, the phase difference is provided by utilizing the birefringence of the waveguide adjacent to the half-wave plate, and thereby, the elimination of the polarization dependence of the interferometer taken as a whole can be achieved.

In the interferometer using the polarization rotator according to the second embodiment, the retarder waveguides having the same birefringence and the half-wave plate adjacent to the retarder waveguides are placed at the center of the two arm waveguides placed between the directional couplers having the optical splitting and optical combining functions; however, the present invention is not so limited, and other configuration may be adopted. However, the half-wave plate has to be placed at a location (i.e., the midpoint of the optical path length) corresponding to the center point of a portion (i.e., the propagation path) such that the optical path difference between the two arm waveguides is produced, if the retarder waveguide is absent, that is, if the retarder waveguide is excluded. Meanwhile, the half-wave plate has to be placed in both the two arm waveguides on the same side relative to the retarder waveguide (that is, one of the optical combiner side and the optical splitter side). However, the position of placement of the half-wave plate is not limited to the same side relative to the retarder waveguide, provided that the retarder waveguide is located at the center of the interferometer taken as a whole, and the configuration of the interferometer is completely symmetrical. Meanwhile, the half-wave plate placed according to the second embodiment is set based on the optic axis (90° or 0° of the waveguide for use as the retarder waveguide, and thus, the optic axis of the half-wave plate is set to 45° or −45°.

Figure 18:
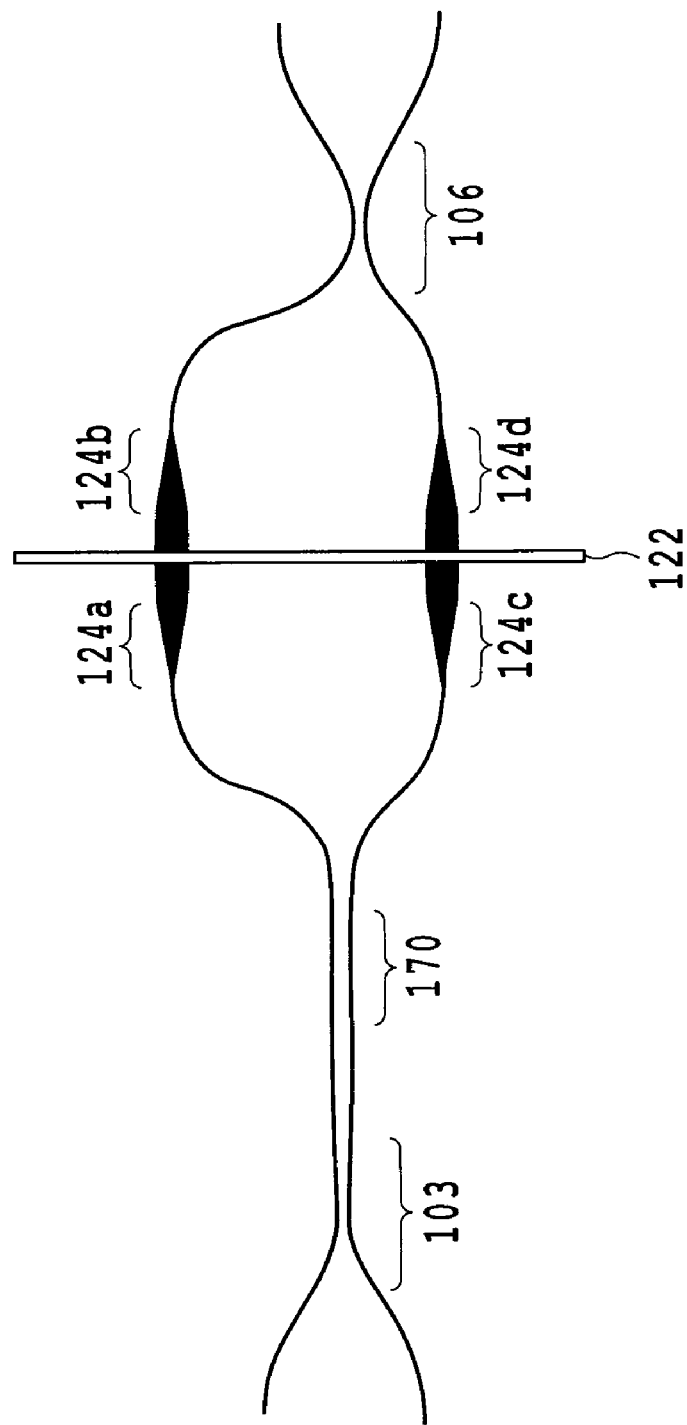
FIG. 18 is a diagram showing an asymmetric MZI according to another form of the second embodiment.

FIG. 18 is a diagram showing the configuration of the asymmetric MZI in another form of the second embodiment. A retarder waveguide 170 may be placed immediately after the optical splitter 103 thereby to eliminate the polarization dependence resulting from the light induced by polarization coupling in the interferometer. In other words, the half-wave plate 122 and the retarder waveguide 170 has not to be adjacent to each other. The position of the retarder waveguide is not limited to the midpoint between the two arm waveguides as is the case with the configuration shown in FIG. 14B. Specifically, the retarder waveguide 170 may be located between the optical splitter 103 and the optical combiner 106 and also on the same side relative to the half-wave plate 122, that is, on the optical splitter 103 side or on the optical combiner 106 side. Meanwhile, the approach of forming a metal layer or an amorphous silicon layer on top of the overcladding layer or other methods, besides control by the width or thickness of the waveguide, may be adopted as a method for providing birefringence to the retarder waveguide 170.

Figure 19A:
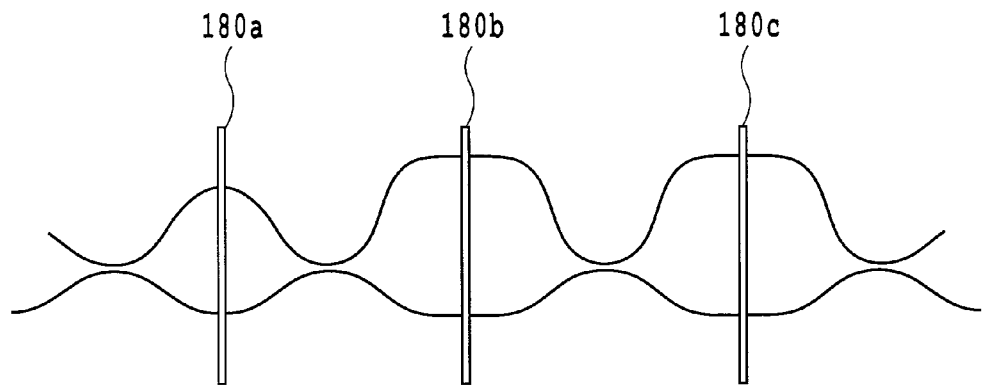
FIG. 19A is a diagram showing the configuration of another optical circuit including polarization rotators according to the present invention.
Figure 19B:
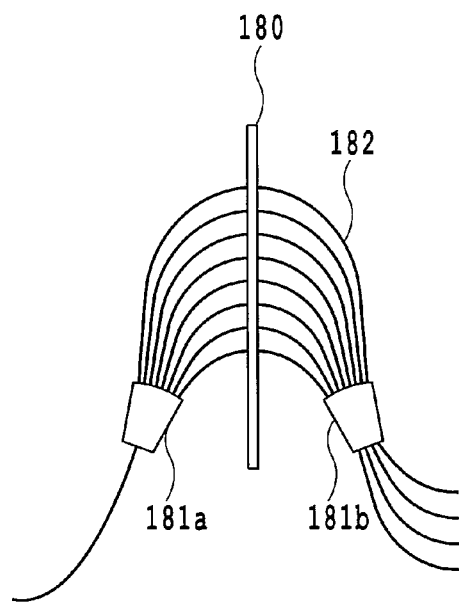
FIG. 19B is a diagram showing the configuration of still another optical circuit including a polarization rotator according to the present invention.

FIGS. 19A and 19B are diagrams explaining examples of application of the present invention to other types of interferometers. As for both the first and second embodiments, description has been given with regard to the method for eliminating the polarization dependence with the asymmetric MZI taken as an example; however, it goes without saying that the same effects can be achieved in other interferometers. In a lattice circuit having concatenation of MZIs in multi-stage configuration as shown for example in FIG. 19A, polarization rotators 180a, 180b and 180c are placed in arm waveguide portions in stages, respectively. The effect of eliminating the polarization dependence can be achieved as in the case of a single asymmetric MZI. Also in an arrayed waveguide grating shown in FIG. 19B, a polarization rotator 180 may be placed in an arrayed waveguide 182 placed between slab waveguides 181a and 181b, thereby to eliminate the polarization dependence.

Third Embodiment

As has been described in detail, the elimination of the polarization dependence of the interferometer caused by the light induced by polarization coupling produced in the directional coupler can be achieved by placing the polarization rotator in the optical path in the interferometer. However, it is demanded that the interferometer become polarization-independent over a wider range of wavelengths, depending on the field of application of the interferometer. In such a case, it is required that the interferometer be designed further allowing for the occurrence of interference in the arm waveguide.

The polarization rotator interposed in the interferometer effects any one of 90° rotation and −90° rotation of all polarizations propagating through the optical path. However, the polarization rotator has an optimum range of operating wavelengths, and thus, a wide range of wavelengths renders it difficult to perform accurate rotation operation for all wavelengths. Even if a match is provided between an optimum operating wavelength for the polarization rotator and a desired center wavelength used in the interferometer, the interferometer can possibly become insufficiently polarization-independent at edge wavelengths in a band of wavelengths used in the interferometer if the band is wide. The reason is that the polarization rotator cannot effect accurate 90° or −90° rotation of all polarization components at the edge wavelengths in the used band, and thus, some polarization components of the edge wavelengths in the band, as unrotated, pass through the polarization rotator. Light that has not been rotated by the polarization rotator, and rotated light experience different optical path lengths, respectively, depending on input polarization, and thus, the polarization dependence develops. Owing to incompleteness of the polarization rotator, the unrotated light and the rotated light interfere with each other in one arm waveguide, and thus, the polarization dependence develops in the transmission characteristics of the interferometer at the edge wavelengths in the used band.

Figures 20A, 20B:
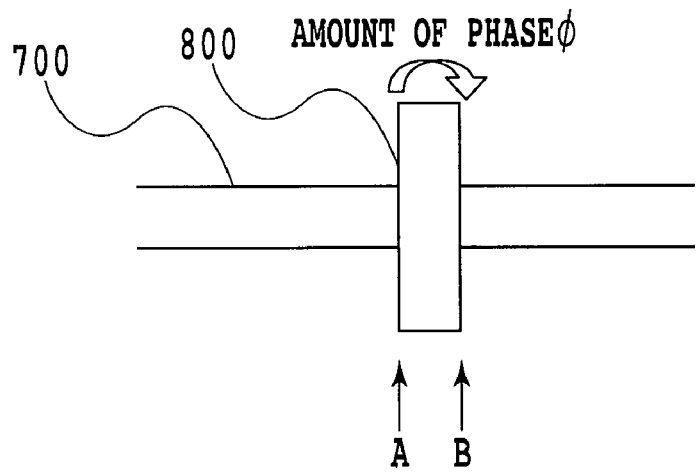
FIG. 20A is a table explaining various in-waveguide interferences.
FIG. 20B is a diagram explaining the in-waveguide interference.

FIGS. 20A and 20B are a table and a diagram, respectively, explaining the interference in the waveguide. As shown in FIG. 20B, the polarization rotator 800 according to the present invention is interposed in the arm waveguide 107 thereby to effect any one of 90° rotation and −90° rotation of each polarization component and also additionally provide the amount of phase ϕ to the arm waveguide. Specifically, the polarization rotator 800 provides a given amount of phase (or a given phase shift) to propagating light between points A and B before and after the polarization rotator 800. Discussion will now be given with regard to conversion from one to another of the TE polarization component and the TM polarization component crossing at right angles, for light as rotated by the polarization rotator and light as not rotated by the polarization rotator. As shown in the table of FIG. 20A, the rotated light is as follows: (a) conversion from the TM polarization to the TE polarization and (b) conversion from the TE polarization to the TM polarization, and the amounts of phase of these are represented by $\phi_{TM \to TE}$ and $\phi_{TE \to TM}$, respectively. On the other hand, the unrotated light is as follows: (c) transmission of the TM polarization as unchanged and (d) transmission of the TE polarization as unchanged, and the amounts of phase of these are represented by $\phi_{TM \to TM}$ and $\phi_{TE \to TE}$, respectively.

Here, as for the conversion (a) and the conversion (d), the light beams, after passing through the polarization rotator 800, are both the light of the TE polarization, and thus the light interferes with each other. The same goes for the conversion (b) and the conversion (c). Thus, the interference in one arm waveguide due to the incompleteness of the polarization rotator, rather than the interference of different arm waveguides that form the interferometer, occurs. As a result, the polarization dependence develops in various characteristics of the interferometer. Description will be given below with regard to a method for preventing the polarization dependence from developing in the transmission characteristics or the like of the interferometer taken as a whole, even if the interference occurs in the arm waveguide as mentioned above.

As mentioned above, the interference in the arm waveguide occurs owing to the polarization rotator, and the interference in the arm waveguide causes a shift in the phase in itself of light propagating through each arm waveguide. However, the elimination of the polarization dependence can be achieved by finding out design conditions for the interferometer such that the phase shift may be judged as being absent between the two arm waveguides that form the interferometer, even at the occurrence of the shift in the phase of the propagating light due to the interference in the arm waveguide. Under such conditions, the elimination of the polarization dependence of the interferometer can be achieved even if the incompleteness of the polarization rotator occurs at the edge wavelengths in the used band.

Discussion will be therefore given, focusing on the total phase difference between different arm waveguides. The total phase difference between the arm waveguides is determined by the optical path difference between the optical splitter and the polarization rotator between the arm waveguides of the multimode coupler, and the phase difference provided by the polarization rotator. The optical path difference between the arm waveguides is indicated by ΔL. The phase difference Φ provided by the polarization rotator can be defined as given below. A polarization dependence phase difference between $\phi_{TM \to TE}$ and $\phi_{TE \to TE}$ mentioned above is indicated by $\Delta\phi T_{TE}$, for example focusing on the TE polarization. Then, when the difference between the arm waveguides of the polarization dependence phase difference $\Delta\phi_{TE}$ is represented as the phase difference Φ between the arm waveguides, the total phase difference between the arm waveguides is expressed by Equation (15). For the sake of simplicity, the Φ will be hereinafter called the phase difference Φ between the waveguides provided by the polarization rotator.

[formula 13]

$$2\pi * B * \Delta L / (2*\lambda) + \Phi \qquad \text{Equation (15)}$$

The total phase difference between the arm waveguides can be regarded as being equal between the two arm waveguides, provided that the value of the total phase difference between the arm waveguides expressed by Equation (15) is equal to 0 or an integral multiple of 2π. Therefore, the relationship expressed by Equation (16) holds based on Equation (15):

[formula 14]

$$B * \Delta L / \lambda = 2*(k - \Phi/2\pi) \qquad \text{Equation (16)}$$

where k is an integer. As will be described later, the phase difference Φ between the waveguides provided by the polarization rotator is 0 if the directions of polarization rotation of the polarization rotators placed in the arm waveguides are equal, or the phase difference Φ is π (180°) if the directions of polarization rotation are different. The birefringence value B of the interferometer may be set so as to satisfy the relationship expressed by Equation (16), thereby to determine the directions of rotation of the polarization rotators in the arm waveguides. Thereby, even at the occurrence of the phase shift of the propagating light due to the incompleteness of the polarization rotator, the value of the total phase difference between the arm waveguides is equal to 0 or an integral multiple of 2π, and thus, the polarization dependence does not develop in the interference characteristics of the interferometer, so that the interferometer that is polarization-independent over a wider range of wavelengths can be achieved.

Since k is an integer on the right-hand side of Equation (16), B that satisfies Equation (16) takes on cyclic values and thus can take on plural values. Therefore, when Equation (16) is solved with respect to k thereby to obtain α as a value which k that should be an integer can actually take on, Equation (17) is obtained.

[formula 15]

$$\alpha = B * \Delta L / (2*\lambda) + \Phi/2\pi \qquad \text{Equation (17)}$$

According to Equation (17), even at the occurrence of the phase shift due to the incompleteness of the polarization rotator, the birefringence value B of the waveguide can be designed so that the α value is an integer in accordance with the value of the phase difference Φ between the waveguides provided by the selected polarization rotator. Even if the α value is not completely an integer, the phase difference Φ between the waveguides provided by the polarization rotator may be selected so that the α value approaches an integer, thereby to optimize B and thus achieve a reduction in the polarization dependence.

If the α value is an integer, the total phase difference between the arm waveguides is equal to 0 or an integral multiple of 2π, and satisfies Equation (15). At this time, regardless of the occurrence of the phase shift due to the interference in the arm waveguide, the total phase difference between the arm waveguides can be regarded as being equal between the two arm waveguides, and thus, the optimum condition is obtained. If α=0.5+m (m is an integer), the total phase difference between the arm waveguides becomes the maximum, which is the worst condition that departs farthest from a desired interference condition. It is preferable that the α value be close to an integer, even when m−0.5<α<m+0.5 (m is an integer), which is an intermediate region.

In actual fabrication of the interferometer, the birefringence B cannot be freely determined so that the α value is an integer, because of demands in the original design of the interferometer or the like, and thus, the setting range of the birefringence B is limited. In the third embodiment, independent polarization rotators are placed in different arm waveguides, respectively, and the directions of rotation of the polarization rotators are independently set for the arm waveguides, respectively, thereby to allow selection to determine whether or not the optic axes of the polarization rotators are inclined in the same direction. In other words, the value of the phase difference Φ between the waveguides provided by the polarization rotator can be selected. Controlling both the birefringence B and the phase difference Φ between the waveguides provided by the polarization rotator makes it easier to bring the α value close to an integer.

Figure 21:
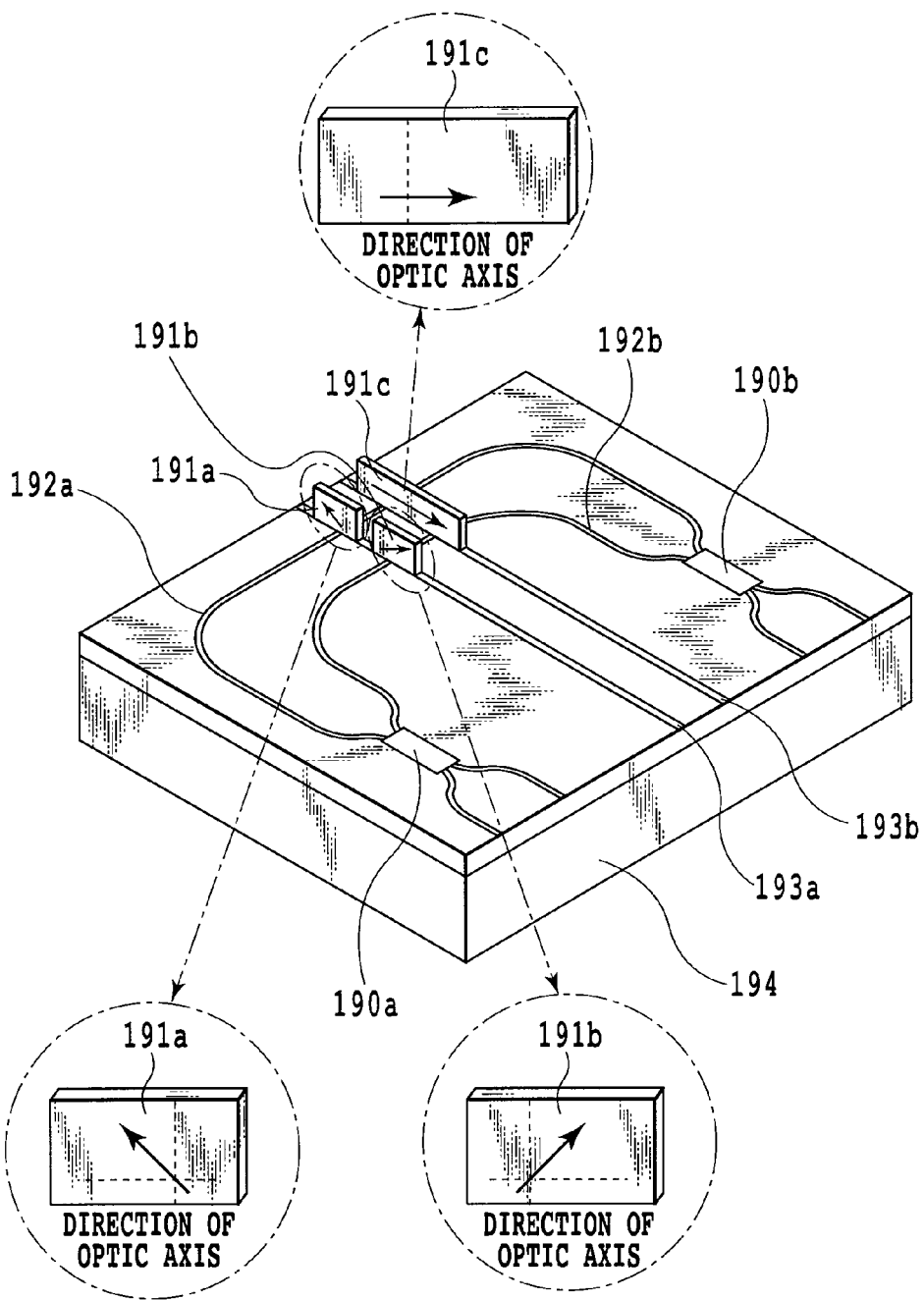
FIG. 21 is a view of configuration of an asymmetric MZI according to a third embodiment of the present invention.

FIG. 21 is a view of configuration of the asymmetric MZI according to the third embodiment fabricated actually. The asymmetric MZI according to the third embodiment is configured of two multimode couplers 190a and 190b formed on a silicon substrate 194, and two arm waveguides 192a and 192b that provide a connection between the two multimode couplers. Here, the polarization rotator is formed of a half-wave plate 191c whose optic axis is parallel to the optic axes of the waveguides, and two types of half-wave plates 191a and 191b whose optic axes are inclined at 45°, the half-wave plates 191a and 191b being placed at the midpoints of the optical path lengths of the arm waveguides 192a and 192b, respectively. Two half-wave plate insertion grooves 193a and 193b are formed, crossing the arm waveguides 192a and 192b. The half-wave plates 191a and 191b and the half-wave plate 191c are inserted in the insertion grooves, respectively. Here, the directions of rotation of the half-wave plates 191a and 191b can be independently set to any one of the half-wave plate whose optic axis is inclined at 45° and the half-wave plate whose optic axis is inclined at −45°. It is to be noted that the configuration according to the third embodiment is different from the asymmetric MZI according to the first embodiment shown in FIG. 9 in that the half-wave plate 901 is the half-wave plate of integral construction.

An example of the configuration of the MZI circuit shown in FIG. 21 is that the half-wave plates 191a and 191b such that a difference between the directions of their inclined axes is 90° are selectively placed in the optical paths of the two arm waveguides 192a and 192b in order that the value of B*ΔL (2*λ) in Equation (17) is equal to 0.5, whereby the phase difference Φ between the waveguides provided by the polarization rotator is set to π (180°) so that the α value can be an integer. In other words, there is shown by way of example an instance where the half-wave plate 191a is inclined at 45° and the half-wave plate 191b is inclined at −45°. It is to be therefore noted that a situation can possibly arise where the half-wave plate 191a is inclined at 45° and the half-wave plate 191b should be likewise inclined at 45°, depending on the settable value of the birefringence B. In this case, the phase difference Φ between the waveguides provided by the polarization rotator is 0. The third embodiment is characterized in that the angles of inclination of the optic axes of the two half-wave plates 191a and 191b are independently selected thereby to appropriately select an initial phase difference provided by the two half-wave plates and thereby set the birefringence B such that the α value can get closer to an integer, thereby enabling a reduction in the polarization dependence of the transmission characteristics or the like of the interferometer taken as a whole over a wider range of wavelengths.

Figure 22:
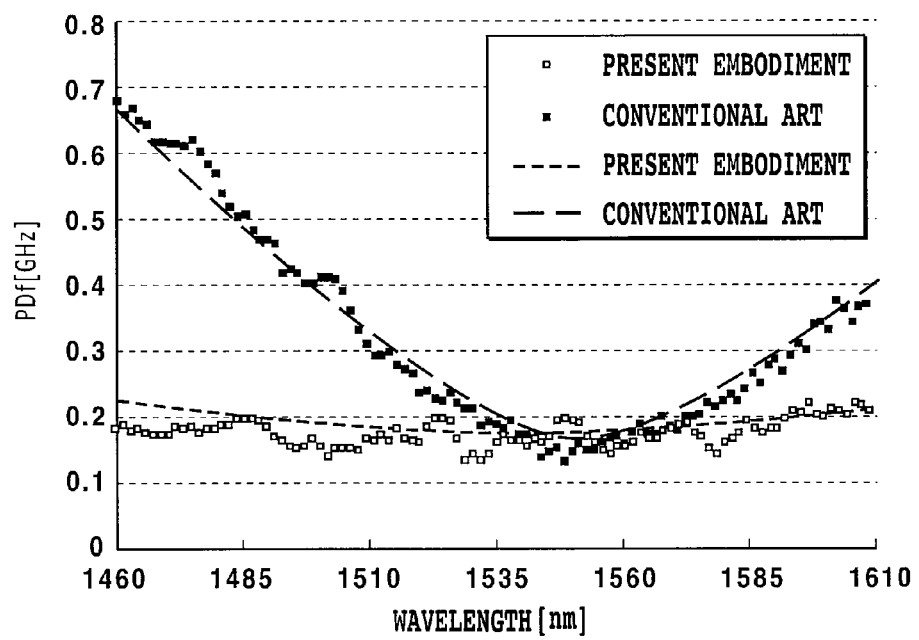
FIG. 22 is a plot showing the wavelength dependence of the PDf of an interferometer designed so that the α value is an integer value.

FIG. 22 is a plot showing the wavelength dependence of the PDf of the interferometer designed so that the α value is an integer value. Plotted are the measured values and calculated values of the wavelength dependence of the PDf of the interferometer in which the directions of inclination of the optic axes of the half-wave plates of the polarization rotator are set in opposite directions at 45° and −45° for the two arm waveguides, respectively, so that B*ΔL(2*λ) in Equation (16) is set equal to 0.5, and the interferometer of the conventional circuit fabricated without consideration for Equation (16).

The fabricated interferometer is the MZI circuit having an FSR of 10 GHz, using a buried waveguide formed on a silicon substrate. The waveguide has a relative refractive-index difference of 1.5%, the undercladding layer has a thickness of 15 μm, and the overcladding layer has a thickness of 20 μm. Measurement of the polarization dependence of the interferometer after fabrication has shown that a shift (Δf) in the transmission spectrum along the frequency axis between the TE and TM polarizations is 10 GHz. Discussion is here given with regard to the arrangement of the half-wave plate and the retarder, allowing for Equation (16). The optical path difference ΔL is expressed by Equation (18):

$$\Delta L = C/FSR/n \qquad \text{Equation (18)}$$

where n denotes an effective refractive index of the waveguide; and C denotes the velocity of light.

Meanwhile, the shift in the transmission spectrum is 10 GHz, and thus, the birefringence B is expressed by Equation (19):

$$B = n*\Delta f/f_0 \qquad \text{Equation (19)}$$

where Δf denotes the amount of shift in the transmission spectrum along the wavelength axis between the TE and TM polarizations; and $f_o$ denotes the frequency of light. Equation (20) is obtained from Equations (18) and (19) and the left-hand side of Equation (16).

$$B*\Delta L/\lambda = \Delta f/FSR = 1 \qquad \text{Equation (20)}$$

Equation (21) is therefore obtained from Equation (16).

$$\phi = \pi*(2*k-1) \qquad \text{Equation (21)}$$

As can be seen from the above, for such a configuration that the relationship expressed by Equation (16) is satisfied, it is required that the directions of rotation of the polarization rotators be set in opposite directions for the two arm waveguides, respectively. Therefore, a half-wave plate made of polyimide, having a using wavelength of 1550 nm, and the retarder are used, and the retarder is placed with its optic axis parallel to the waveguide. The half-wave plates are placed so that their optic axes are inclined at 45° and −45° for the two arm waveguides, respectively. As can be seen from FIG. 22, the third embodiment enables a reduction in the PDf over a wider range of wavelengths, as compared to the case designed without allowing for the α value.

As mentioned above, it is most preferable that the α value be an integer; however, the range of a such that the effect of the third embodiment can be fully achieved may be determined as given below.

Figure 23:
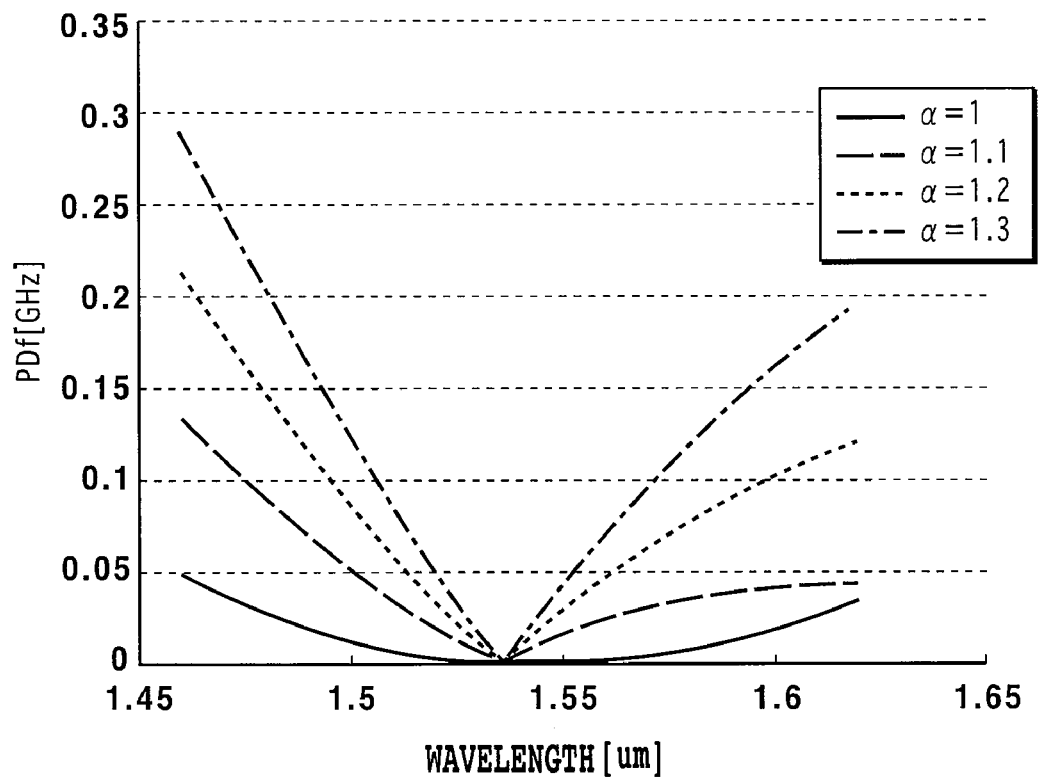
FIG. 23 is a graph showing the calculated results of the wavelength dependence of the PDf of an interferometer having an FSR of 10 GHz, provided that a has varying values from 1 to 1.3.

FIG. 23 is a graph showing the calculated results of the polarization dependence of the PDf of the interferometer having an FSR of 10 GHz, provided that a has varying values from 1 to 1.3. It can be seen that, when a is offset from 1 (an integer), deterioration in the PDf occurs at edge wavelengths in the band. It can be seen that the wavelength region width of a small PDf tends to become narrower with an increase in α.

Figure 24:
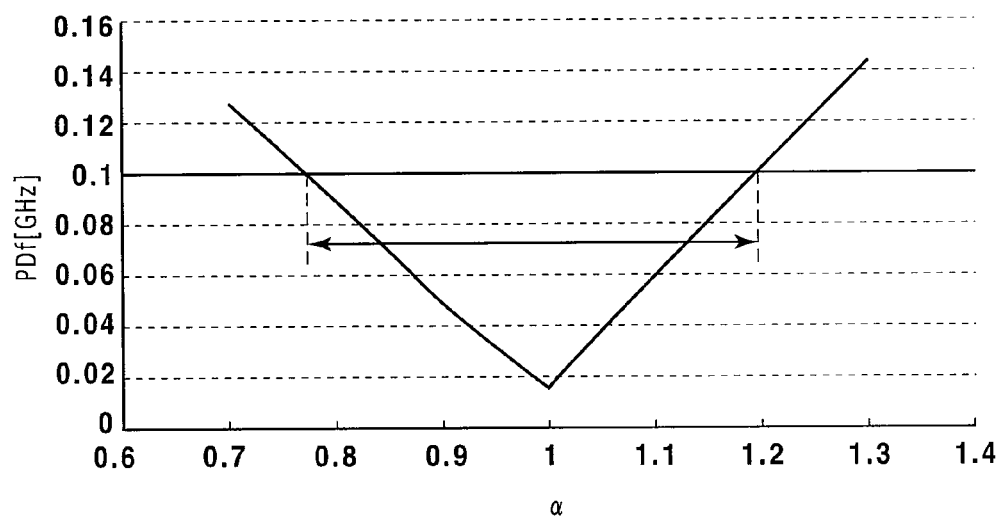
FIG. 24 is a graph plotting the maximum PDf value in a used wavelength band of 0.8 μm, using α as a parameter.

FIG. 24 is a graph plotting the maximum PDf value in a used wavelength band of 0.8 μm (wavelengths of 1.53 to 1.61 nm), using α as a parameter. Typically, the maximum permissible amount of PDf is about 1/100 of the FSR, when the interferometer is used as a receiving circuit based on DQPSK or DPSK modulation method, for use in an optical communication system. From FIG. 24, it can be therefore seen that the α value such that the PDf can become 0.1 GHz or less lies in an approximate range of 0.75<α<1.2. As generally expressed, α is set so as to satisfy the relationship m−0.25<α<m+0.20 (where m is an integer), so that the PDf can become 0.1 GHz or less. As mentioned above, the elimination of the polarization dependence of the interferometer can be achieved even if the incompleteness of the polarization rotator occurs at the edge wavelengths in the used band.

Fourth Embodiment

The asymmetric MZI according to any one of the above-mentioned embodiments may include an adjusting means for compensating for a fabrication error in the polarization rotator, thereby to achieve a further improvement in the polarization dependence.

Figure 25:
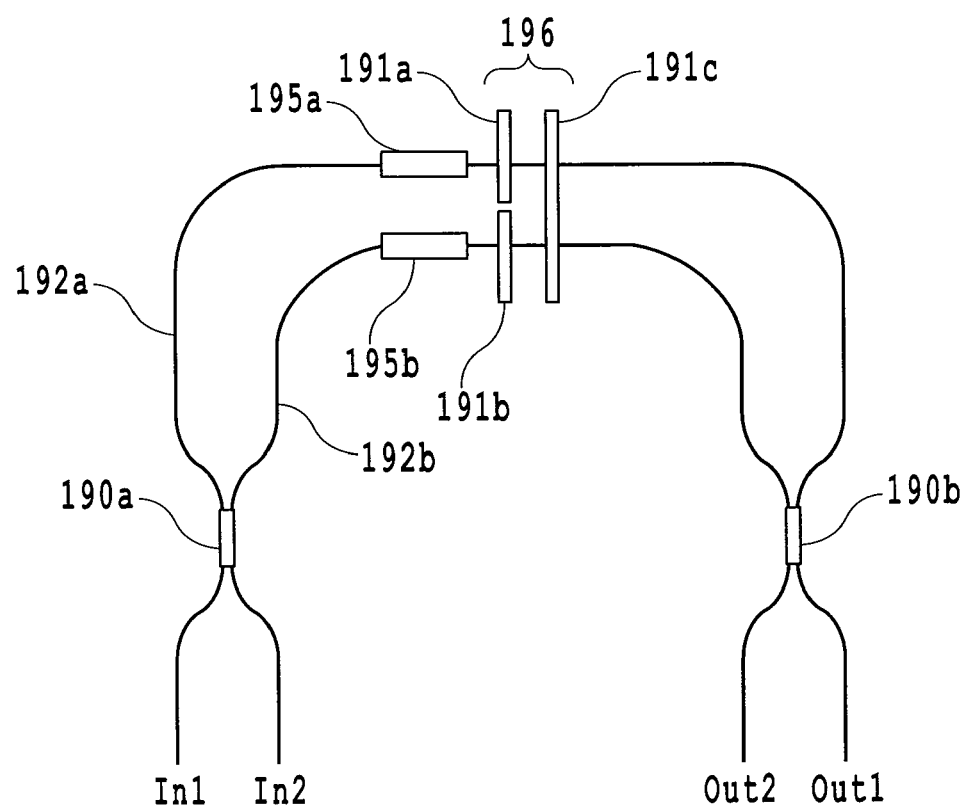
FIG. 25 is a diagram of configuration of an asymmetric MZI including means for compensating for a fabrication error or the like in the polarization rotator.

FIG. 25 is a diagram of configuration of the asymmetric MZI including the means for compensating for the fabrication error or the like in the polarization rotator. The characteristic of polarization rotation of the polarization rotator can possibly be different from a desired characteristic owing to variations in the structure in itself of a device or a manufacturing error in assembly. An adjusting process is provided after the fabrication of the interferometer, thereby enabling a further reduction in the polarization dependence, in any of an instance where two types of half-wave plates, that is, a half-wave plate whose optic axis is parallel to the optic axes of the waveguides and a half-wave plate whose optic axis is inclined at 45° are used to implement the polarization rotator, and an instance where an half-wave plate whose optic axis is parallel to the optic axes of the waveguides and a waveguide having a birefringence are used to implement the polarization rotator.

For the polarization rotator, it is necessary to provide an equal phase difference for both arms at all times, while adjusting the phase difference between the polarizations horizontal and vertical to the optic axes of the waveguides. Therefore, equal birefringence adjustment is performed for both arm waveguides on any one of the input waveguide side and the output waveguide side of the polarization rotator, depending on the amount of shift in the characteristic of the polarization rotator. As shown for example in FIG. 25, ultraviolet irradiation regions 195a and 195b may be provided in which birefringence can be induced in the arm waveguides by an ultraviolet laser. The ultraviolet irradiation regions 195a and 195b can compensate for the fabrication error in the polarization rotator. On the input waveguide side of the polarization rotator, the birefringence is induced in the ultraviolet irradiation regions 195a and 195b, and the dose of ultraviolet irradiation and the length of the irradiation region may be controlled so that the amount of induction is equal for both arm waveguides. This enables adjustment of the polarization rotator or the retarder waveguide. In FIG. 25, the ultraviolet irradiation region is located on the input waveguide side of the polarization rotator; however, the region may be located on the output waveguide side.

As described in detail above, the present invention makes it possible to achieve the optical circuit capable of elimination of the polarization dependence resulting from the light induced by polarization coupling. This invention may utilize a polarization rotator of simple configuration such as a combination of multiple half-wave plates or a combination of the half-wave plate and the waveguide having birefringence properties, thereby to achieve the optical circuit excellent in mass production and also flexibly adaptable to manufacturing variability. Further, this invention achieves a reduction in the interference in the arm waveguide that can possibly occur owing to the incompleteness of the polarization coupling in the half-wave plate or the like, thereby achieving the elimination of the polarization dependence.

Industrial Applicability

The optical interferometer of the present invention can be applied to optical communication equipment for use in an optical communication network or the like.

The invention claimed is:

1. A waveguide-type optical interferometer including at least one input waveguide, an optical splitter connected to the input waveguide, at least one output waveguide, an optical combiner connected to the output waveguide, and at least two arm waveguides that provide a connection between the optical splitter and the optical combiner, the waveguide-type optical interferometer comprising:
   a first half-wave plate interposed at a midpoint of an optical path length of each of the at least two arm waveguides; and
   a second half-wave plate having an optic axis inclined at any one of 45° and −45° relatively to the first half-wave plate, and interposed in the at least two arm waveguides on any one of the input waveguide side and the output waveguide side of the at least two arm waveguides;
   wherein:
   the at least two arm waveguides are formed of two arm waveguides of a long arm waveguide and a short arm waveguide, and the first half-wave plate includes separate half-wave plates for the long arm waveguide and the short arm waveguide, respectively,
   the separate half-wave plates and the second half-wave plate form separate polarization rotators, respectively,
   the inclinations of optic axes of the respective separate half-wave plates are set so that the optic axes extend in the same direction or form an angle of 90°, and
   birefringence B is set so as to obtain the relationship m−0.25<α<m+0.20 (where m is an integer) for the value of α expressed by:

$$\alpha = B^* \Delta L / (2^* \lambda) + \Phi/2\pi$$

where ΔL denotes an optical path difference between the long arm waveguide and the short arm waveguide; B denotes the birefringence of the waveguides; λ denotes a wavelength used in the interferometer; and Φ denotes a phase difference between the arm waveguides, provided that the phase difference Φ is set equal to 0° or 180°, when the inclinations of optic axes of the respective separate half-wave plates are set so that the optic axes extend in the same direction or form an angle of 90°.

2. The waveguide-type optical interferometer according to claim 1, wherein the value of α is an integer.

3. A waveguide-type optical interferometer including at least one input waveguide, an optical splitter connected to the input waveguide, at least one output waveguide, an optical combiner connected to the output waveguide, and at least two arm waveguides that provide a connection between the optical splitter and the optical combiner, the waveguide-type optical interferometer comprising:
   a first half-wave plate interposed at a midpoint of an optical path length of each of the at least two arm waveguides; and
   a second half-wave plate having an optic axis inclined at any one of 45° and −45° relatively to the first half-wave plate, and interposed in the at least two arm waveguides on any one of the input waveguide side and the output waveguide side of the at least two arm waveguides;

wherein:
the at least two arm waveguides are formed of two arm waveguides of a long arm waveguide and a short arm waveguide, and the second half-wave plate includes separate half-wave plates for the long arm waveguide and the short arm waveguide, respectively, the first half-wave plate and the separate half-wave plates form separate polarization rotators, respectively, the optic axes of the separate half-wave plates are independently set at any one of 45° and −45° relatively to the first half-wave plate, and birefringence B is set so as to obtain the relationship m−0.25<α<m+0.20 (where m is an integer) for the value of α expressed by:

$$\alpha = B * \Delta L / (2 * \lambda) + \Phi / 2\pi$$

where ΔL denotes an optical path difference between the long arm waveguide and the short arm waveguide; B denotes the birefringence of the waveguides; λ denotes a wavelength used in the interferometer; and Φ denotes a phase difference between the arm waveguides, provided that the phase difference Φ is set equal to 0° or 180°, when the inclinations of optic axes of the respective separate half-wave plates are set so that the optic axes extend in the same direction or form an angle of 90°.

4. The waveguide-type optical interferometer according to claim 3, wherein the value of α is an integer.

5. A waveguide-type optical interferometer including at least one input waveguide, an optical splitter connected to the input waveguide, at least one output waveguide, an optical combiner connected to the output waveguide, and at least two arm waveguides that provide a connection between the optical splitter and the optical combiner, the waveguide-type optical interferometer comprising:

phase difference providing waveguide portions that provide a phase difference of 180° between polarizations crossing at right angles in the at least two arm waveguides, at operating wavelengths used in the optical interferometer, the phase difference providing waveguide portions being contained in the at least two arm waveguides, respectively; and a half-wave plate having an optic axis inclined at any one of 45° and −45° relative to optic axes of the at least two arm waveguides, and interposed in the at least two arm waveguides at a location corresponding to a midpoint of an optical path length of each of the at least two arm waveguides in the absence of the phase difference providing waveguide portions, the half-wave plate being located in the phase difference providing waveguide portion on any one of the input waveguide side and the output waveguide side;

wherein a length $L_r$ of the phase difference providing waveguide portions satisfies the following relationship:

$$\lambda_0 * (0.25+m)/B_r < L_r < \lambda_0 * (0.75+m)/B_r$$

where $B_r$ denotes birefringence of the arm waveguides; $\lambda_0$ denotes a wavelength used in the interferometer; and m denotes an integer.

6. The waveguide-type optical interferometer according to claim 5, wherein the length $L_r$ of the phase difference providing waveguide portions further satisfies the following relationship:

$$L_r = \lambda_0 * (\tfrac{1}{2}+m)/B_r$$

where $B_r$ denotes the birefringence of the arm waveguides; $\lambda_0$ denotes the wavelength used in the interferometer; and m denotes an integer.

7. The waveguide-type optical interferometer according to claim 6, wherein each of the phase difference providing waveguide portions is located at the midpoint of the optical path length of a corresponding one of the at least two arm waveguides in the absence of the phase difference providing waveguide portions; each of the at least two arm waveguides includes waveguides located respectively at ends of the corresponding one of the phase difference providing waveguide portions, each waveguide producing an optical path difference that determines an interference condition for the optical interferometer; and the phase difference providing waveguide portions have an equal value of birefringence.

8. A waveguide-type optical interferometer including at least one input waveguide, an optical splitter connected to the input waveguide, at least one output waveguide, an optical combiner connected to the output waveguide, and at least two arm waveguides that provide a connection between the optical splitter and the optical combiner, the waveguide-type optical interferometer comprising:

phase difference providing waveguide portions that provide a phase difference of 180° between polarizations crossing at right angles in the at least two arm waveguides, at operating wavelengths used in the optical interferometer, the phase difference providing waveguide portions being contained in the at least two arm waveguides, respectively; and a half-wave plate having an optic axis inclined at any one of 45° and −45° relative to optic axes of the at least two arm waveguides, and interposed in the at least two arm waveguides at a location corresponding to a midpoint of an optical path length of each of the at least two arm waveguides in the absence of the phase difference providing waveguide portions, the half-wave plate being located in the phase difference providing waveguide portion on any one of the input waveguide side and the output waveguide side;

wherein:
the at least two arm waveguides are formed of two arm waveguides of a long arm waveguide and a short arm waveguide, and the half-wave plate includes separate half-wave plates for the long arm waveguide and the short arm waveguide, respectively, sets each including one of the phase difference providing waveguide portions and a corresponding one of the separate half-wave plates form separate polarization rotators, respectively, the optic axes of the separate half-wave plates are independently set at any one of 45° and −45° relatively to the optic axes of the arm waveguides, and birefringence B is set so as to obtain the relationship m−0.25<α<m+0.20 (where m is an integer) for the value of α expressed by:

$$\alpha = B * \Delta L / (2 * \lambda) + \Phi / 2\pi$$

where ΔL denotes an optical path difference between the long arm waveguide and the short arm waveguide; B denotes the birefringence of the waveguides; λ denotes a wavelength used in the interferometer; and Φ denotes a phase difference between the arm waveguides, provided that the phase difference Φ is set equal to 0° or 180°, when the inclinations of optic axes of the respective separate half-wave plates are set so that the optic axes extend in the same direction or form an angle of 90°.

9. The waveguide-type optical interferometer according to claim 6, wherein the at least two arm waveguides are formed of two arm waveguides of a long arm waveguide and a short arm waveguide, and the half-wave plate includes separate half-wave plates for the long arm waveguide and the short arm waveguide, respectively, sets each including one of the phase difference providing waveguide portions and a corresponding one of the separate half-wave plates form separate polarization rotators, respectively, the optic axes of the separate half-wave plates are independently set at any one of 45° and −45° relatively to the optic axes of the arm waveguides, and birefringence B is set so as to obtain the relationship m−0.25<α<m+0.20 (where m is an integer) for the value of α expressed by:

$$\alpha=B*\Delta L/(2*\lambda)+\Phi/2\pi$$

where ΔL denotes an optical path difference between the long arm waveguide and the short arm waveguide; B denotes the birefringence of the waveguides; λ denotes a wavelength used in the interferometer; and Φ denotes a phase difference between the arm waveguides, provided that the phase difference Φ is set equal to 0° or 180°, when the inclinations of optic axes of the respective separate half-wave plates are set so that the optic axes extend in the same direction or form an angle of 90°.

10. The waveguide-type optical interferometer according to claim 7, wherein the at least two arm waveguides are formed of two arm waveguides of a long arm waveguide and a short arm waveguide, and the half-wave plate includes separate half-wave plates for the long arm waveguide and the short arm waveguide, respectively, sets each including one of the phase difference providing waveguide portions and a corresponding one of the separate half-wave plates form separate polarization rotators, respectively, the optic axes of the separate half-wave plates are independently set at any one of 45° and −45° relatively to the optic axes of the arm waveguides, and birefringence B is set so as to obtain the relationship m−0.25<α<m+0.20 (where m is an integer) for the value of α expressed by:

$$\alpha=B*\Delta L/(2*\lambda)+\Phi/2\pi$$

where ΔL denotes an optical path difference between the long arm waveguide and the short arm waveguide; B denotes the birefringence of the waveguides; λ denotes a wavelength used in the interferometer; and Φ denotes a phase difference between the arm waveguides, provided that the phase difference Φ is set equal to 0° or 180°, when the inclinations of optic axes of the respective separate half-wave plates are set so that the optic axes extend in the same direction or form an angle of 90°.

11. The waveguide-type optical interferometer according to claim 9, wherein the value of α is an integer.

12. The waveguide-type optical interferometer according to claim 10, wherein the value of α is an integer.

13. The waveguide-type optical interferometer according to claim 5, wherein each of the phase difference providing waveguide portions is located at the midpoint of the optical path length of a corresponding one of the at least two arm waveguides in the absence of the phase difference providing waveguide portions; each of the at least two arm waveguides includes waveguides located respectively at ends of the corresponding one of the phase difference providing waveguide portions, each waveguide producing an optical path difference that determines an interference condition for the optical interferometer; and the phase difference providing waveguide portions have an equal value of birefringence, the at least two arm waveguides are formed of two arm waveguides of a long arm waveguide and a short arm waveguide, and the half-wave plate includes separate half-wave plates for the long arm waveguide and the short arm waveguide, respectively, sets each including one of the phase difference providing waveguide portions and a corresponding one of the separate half-wave plates form separate polarization rotators, respectively, the optic axes of the separate half-wave plates are independently set at any one of 45° and −45° relatively to the optic axes of the arm waveguides, and birefringence B is set so as to obtain the relationship m−0.25<α<m+0.20 (where m is an integer) for the value of α expressed by:

$$\alpha=B*\Delta L/(2*\lambda)+\Phi/2\pi$$

where ΔL denotes an optical path difference between the long arm waveguide and the short arm waveguide; B denotes the birefringence of the waveguides; λ denotes a wavelength used in the interferometer; and Φ denotes a phase difference between the arm waveguides, provided that the phase difference Φ is set equal to 0° or 180°, when the inclinations of optic axes of the respective separate half-wave plates are set so that the optic axes extend in the same direction or form an angle of 90°, and the value of α is an integer.

* * * * *